US011917581B2

(12) United States Patent
Zhang

(10) Patent No.: US 11,917,581 B2
(45) Date of Patent: *Feb. 27, 2024

(54) METHOD AND DEVICE IN UE AND BASE STATION USED FOR PAGING

(71) Applicant: APEX BEAM TECHNOLOGIES LLC, Marshall, TX (US)

(72) Inventor: Xiaobo Zhang, Shanghai (CN)

(73) Assignee: APEX BEAM TECHNOLOGIES LLC, Marshall, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/950,726

(22) Filed: Sep. 22, 2022

(65) Prior Publication Data

US 2023/0224857 A1 Jul. 13, 2023

Related U.S. Application Data

(63) Continuation of application No. 17/180,885, filed on Feb. 22, 2021, now Pat. No. 11,457,426, which is a
(Continued)

(30) Foreign Application Priority Data

Apr. 19, 2017 (CN) .......................... 201710255811.X

(51) Int. Cl.
*H04W 68/02* (2009.01)
*H04L 5/00* (2006.01)
(Continued)

(52) U.S. Cl.
CPC .......... *H04W 68/02* (2013.01); *H04L 1/1812* (2013.01); *H04L 5/0053* (2013.01); *H04L 25/00* (2013.01);
(Continued)

(58) Field of Classification Search
CPC ............. H04W 68/02; H04W 36/0088; H04W 68/005; H04W 72/23; H04W 72/0453;
(Continued)

(56) References Cited

U.S. PATENT DOCUMENTS 6,185,432 B1 2/2001 Vembu
7,945,222 B2 5/2011 Harel et al.
(Continued)

FOREIGN PATENT DOCUMENTS

CN 105813200 A 7/2016
CN 105979597 A 9/2016
(Continued)

OTHER PUBLICATIONS

1st Office Action received in Application No. 201710255811.X dated Oct. 9, 2020.
(Continued)

*Primary Examiner* — Ahmed Elallam
(74) *Attorney, Agent, or Firm* — Zhong Law, LLC

(57) ABSTRACT

The present disclosure provides a method and a device in a User Equipment (UE) and a base station used for paging. The UE first monitors a first signaling in X time intervals respectively, and then receives a first radio signal. The first signaling is used for determining scheduling information for the first radio signal. The scheduling information includes at least one of {occupied time-frequency resource, adopted MCS, subcarrier spacing of subcarriers in occupied frequency domain resource}. The first radio signal carries a paging message. The frequency domain resource is used for transmitting the first signaling belongs to a first subband. The first subband includes a positive integer number of consecutive subcarriers in frequency domain. At least one of {location of the first subband in frequency domain, subcar-
(Continued)

rier spacing of subcarriers included in the first subband} is used for determining the X time intervals.

24 Claims, 6 Drawing Sheets

Related U.S. Application Data continuation of application No. 16/577,854, filed on Sep. 20, 2019, now Pat. No. 10,966,178, which is a continuation of application No. 15/956,742, filed on Apr. 18, 2018, now Pat. No. 10,462,767.

(51) Int. Cl.
*H04W 36/00* (2009.01)
*H04L 1/1812* (2023.01)
*H04L 25/00* (2006.01)
*H04W 68/00* (2009.01)
*H04W 72/23* (2023.01)

(52) U.S. Cl.
CPC ..... *H04W 36/0088* (2013.01); *H04W 68/005* (2013.01); *H04W 72/23* (2023.01); *H04L 5/0007* (2013.01); *H04L 5/0044* (2013.01)

(58) Field of Classification Search
CPC ..... H04L 1/1812; H04L 5/0053; H04L 25/00; H04L 5/0007; H04L 5/0044; H04L 5/0008; H04L 5/001; H04L 27/2666; H04L 27/2678
See application file for complete search history.

(56) References Cited

U.S. PATENT DOCUMENTS

| | | | |
|---|---|---|---|
| 8,027,374 B2 | 9/2011 | Sun | |
| 8,116,693 B2 | 2/2012 | Harel | |
| 8,644,864 B2 | 2/2014 | Zeira et al. | |
| 8,654,667 B2 | 2/2014 | Li | |
| 9,131,490 B2 | 9/2015 | Feng | |
| 9,236,992 B2 | 1/2016 | Chung | |
| 9,264,195 B2 | 2/2016 | Park | |
| 9,294,310 B2 | 3/2016 | Wu | |
| 9,379,788 B2 | 6/2016 | Clevorn | |
| 9,380,568 B2 | 6/2016 | Harrison | |
| 9,425,934 B2 | 8/2016 | Seo | |
| 9,474,063 B2 | 10/2016 | Han | |
| 9,497,750 B2 | 11/2016 | Li | |
| 9,510,335 B2 | 11/2016 | Ko | |
| 9,520,973 B2 | 12/2016 | Kim | |
| 9,538,516 B2 | 1/2017 | Seo | |
| 9,572,149 B1 | 2/2017 | Zhou | |
| 9,603,081 B2 | 3/2017 | Seo | |
| 9,730,200 B2 | 8/2017 | Qu | |
| 9,787,387 B2 | 10/2017 | Moon | |
| 9,860,033 B2 | 1/2018 | Kadous | |
| 9,867,176 B2 | 1/2018 | Li | |
| 9,877,312 B2 | 1/2018 | Kim | |
| 9,882,691 B2 | 1/2018 | Kang | |
| 9,883,503 B2 | 1/2018 | Seo | |
| 9,900,891 B1 | 2/2018 | Islam | |
| 9,923,613 B2 | 3/2018 | Lee | |
| 9,955,474 B2 | 4/2018 | Lee | |
| 10,050,758 B2 | 8/2018 | Seo | |
| 10,135,663 B2 | 11/2018 | Qu et al. | |
| 10,148,400 B2 | 12/2018 | Zhang | |
| 10,159,097 B2 | 12/2018 | Ji et al. | |
| 10,171,212 B2 | 1/2019 | Park | |
| 10,218,461 B2 | 2/2019 | Wang | |
| 10,271,295 B2 | 4/2019 | Tsai et al. | |
| 10,298,372 B2 | 5/2019 | Zhu | |
| 10,299,267 B2 | 5/2019 | Wang | |
| 10,356,778 B2 | 7/2019 | Tseng et al. | |
| 10,419,177 B2 | 9/2019 | Qian et al. | |
| 10,425,139 B2 | 9/2019 | Guo | |
| 10,432,441 B2 | 10/2019 | Papasakellariou | |
| 10,448,414 B2 | 10/2019 | Ying et al. | |
| 10,454,555 B2 | 10/2019 | Kwak | |
| 10,461,994 B2 | 10/2019 | Liu | |
| 10,462,739 B2 | 10/2019 | Papasakellariou | |
| 10,462,767 B2 * | 10/2019 | Zhang | H04W 68/02 |
| 10,506,576 B2 | 12/2019 | John Wilson | |
| 10,548,129 B2 | 1/2020 | Fwu | |
| 10,567,057 B2 | 2/2020 | Park | |
| 10,631,291 B2 | 4/2020 | Lee | |
| 10,660,081 B2 | 5/2020 | You et al. | |
| 10,660,120 B2 | 5/2020 | Kim et al. | |
| 10,700,752 B2 | 6/2020 | Jung | |
| 10,778,303 B2 | 9/2020 | Kim | |
| 10,779,350 B2 | 9/2020 | Xia | |
| 10,785,747 B2 | 9/2020 | Kim | |
| 10,790,953 B2 | 9/2020 | Kim | |
| 10,856,317 B2 * | 12/2020 | Ma | H04W 72/21 |
| 10,966,178 B2 * | 3/2021 | Zhang | H04W 68/02 |
| 10,972,974 B2 | 4/2021 | Xiong | |
| 11,026,217 B2 | 6/2021 | Chae | |
| 11,044,744 B2 | 6/2021 | Wang | |
| 11,051,293 B2 | 6/2021 | Tsai et al. | |
| 11,063,703 B2 * | 7/2021 | Yi | H04L 5/0094 |
| 11,088,747 B2 | 8/2021 | Islam | |
| 11,088,749 B2 | 8/2021 | Chang | |
| 11,139,933 B2 | 10/2021 | Xu | |
| 11,159,213 B2 | 10/2021 | Zhang | |
| 11,197,283 B2 | 12/2021 | Lyu et al. | |
| 11,223,394 B2 | 1/2022 | Lee | |
| 11,233,557 B2 | 1/2022 | Lee | |
| 11,252,717 B2 | 2/2022 | Islam et al. | |
| 11,265,901 B2 | 3/2022 | Freda | |
| 11,291,078 B2 * | 3/2022 | Xiong | H04W 80/08 |
| 11,310,764 B2 | 4/2022 | Kim | |
| 11,419,173 B2 | 8/2022 | Deenoo | |
| 11,457,426 B2 * | 9/2022 | Zhang | H04L 25/00 |
| 2006/0164981 A1 | 7/2006 | Olsson | |
| 2010/0039970 A1 | 2/2010 | Papasakellariou | |
| 2010/0202382 A1 | 8/2010 | Park | |
| 2010/0202560 A1 | 8/2010 | Luo | |
| 2011/0038330 A1 | 2/2011 | Luo | |
| 2011/0096856 A1 | 4/2011 | Sadowsky | |
| 2011/0171212 A1 | 7/2011 | Belka | |
| 2011/0176519 A1 | 7/2011 | Vitthaladevuni | |
| 2011/0286420 A1 | 11/2011 | Cho | |
| 2012/0122495 A1 | 5/2012 | Weng | |
| 2012/0257515 A1 | 10/2012 | Hugl | |
| 2012/0314711 A1 | 12/2012 | Trachewsky | |
| 2013/0083753 A1 | 4/2013 | Lee | |
| 2013/0148515 A1 | 6/2013 | Ribeiro | |
| 2013/0182594 A1 | 7/2013 | Kim | |
| 2013/0195067 A1 | 8/2013 | Khoshnevis | |
| 2013/0286960 A1 | 10/2013 | Li | |
| 2013/0301562 A1 | 11/2013 | Liao | |
| 2013/0308608 A1 | 11/2013 | Hu | |
| 2014/0036806 A1 | 2/2014 | Chen | |
| 2014/0140435 A1 | 5/2014 | Zhang | |
| 2014/0192917 A1 | 7/2014 | Nam | |
| 2014/0211656 A1 | 7/2014 | Hu | |
| 2014/0148204 A1 | 12/2014 | Zeira et al. | |
| 2015/0003343 A1 | 1/2015 | Li | |
| 2015/0009968 A1 | 1/2015 | Yu | |
| 2015/0036612 A1 | 2/2015 | Kim | |
| 2015/0055555 A1 | 2/2015 | Kim | |
| 2015/0063287 A1 | 3/2015 | Mazzarese | |
| 2015/0141026 A1 | 5/2015 | Jover | |
| 2015/0195025 A1 | 7/2015 | Kang | |
| 2015/0230102 A1 | 8/2015 | Kang | |
| 2015/0282070 A1 | 10/2015 | Salem | |
| 2015/0341093 A1 | 11/2015 | Ji | |
| 2015/0358060 A1 | 12/2015 | Park | |
| 2015/0358848 A1 | 12/2015 | Kim | |
| 2016/0080052 A1 | 3/2016 | Li | |
| 2016/0105265 A1 | 4/2016 | Wang | |
| 2016/0112099 A1 | 4/2016 | Lee | |
| 2016/0142189 A1 | 5/2016 | Shin | |

(56) References Cited

U.S. PATENT DOCUMENTS

| | | |
|---|---|---|
| 2016/0182137 A1 | 6/2016 | Onggosanusi |
| 2016/0183228 A1 | 6/2016 | Song |
| 2016/0211902 A1 | 7/2016 | Park |
| 2016/0277092 A1 | 9/2016 | Pi |
| 2016/0323028 A1 | 11/2016 | Cheng |
| 2017/0070277 A1 | 3/2017 | Si |
| 2017/0085303 A1 | 3/2017 | Chen |
| 2017/0086195 A1 | 3/2017 | Yum |
| 2017/0094547 A1 | 3/2017 | Yum |
| 2017/0150480 A1 | 5/2017 | Kim |
| 2017/0207843 A1 | 7/2017 | Jung |
| 2017/0215170 A1 | 7/2017 | Islam |
| 2017/0230994 A1 | 8/2017 | You |
| 2017/0237478 A1 | 8/2017 | KwaK |
| 2017/0279579 A1 | 9/2017 | Qian et al. |
| 2017/0288743 A1 | 10/2017 | Nam |
| 2017/0331670 A1 | 11/2017 | Parkvall |
| 2017/0339667 A1 | 11/2017 | Shen |
| 2017/0373743 A1 | 12/2017 | Park |
| 2018/0007574 A1 | 1/2018 | Park |
| 2018/0007673 A1 | 1/2018 | Fwu |
| 2018/0034525 A1 | 2/2018 | Park |
| 2018/0054290 A1 | 2/2018 | Park |
| 2018/0054348 A1 | 2/2018 | Luo |
| 2018/0054790 A1 | 2/2018 | Islam |
| 2018/0054800 A1 | 2/2018 | Yeo |
| 2018/0070341 A1 | 3/2018 | Islam et al. |
| 2018/0083680 A1 | 3/2018 | Guo |
| 2018/0092139 A1 | 3/2018 | Novlan |
| 2018/0097678 A1 | 4/2018 | Zhou et al. |
| 2018/0098234 A1 | 4/2018 | Kim |
| 2018/0110074 A1 | 4/2018 | Akkarakaran |
| 2018/0192443 A1 | 7/2018 | Novlan |
| 2018/0227156 A1 | 8/2018 | Papasakellariou |
| 2018/0241454 A1 | 8/2018 | Lee |
| 2018/0254867 A1 | 9/2018 | Kim |
| 2018/0279229 A1 | 9/2018 | Dinan |
| 2018/0279289 A1 | 9/2018 | Islam et al. |
| 2018/0279327 A1 | 9/2018 | Ying et al. |
| 2018/0294859 A1 | 10/2018 | Niu |
| 2018/0310283 A1 | 10/2018 | Deenoo |
| 2018/0310322 A1 | 10/2018 | Zhang |
| 2018/0323842 A1 | 11/2018 | Majmundar |
| 2018/0324780 A1 | 11/2018 | Novlan |
| 2018/0324843 A1 | 11/2018 | Lee |
| 2018/0324865 A1 | 11/2018 | Hui |
| 2018/0332605 A1 | 11/2018 | Pelletier |
| 2018/0367203 A1 | 12/2018 | Nilsson |
| 2018/0367374 A1 | 12/2018 | Liu |
| 2018/0368009 A1 | 12/2018 | Xia |
| 2018/0375556 A1 | 12/2018 | Wang |
| 2019/0028162 A1 | 1/2019 | Lee |
| 2019/0052337 A1 | 2/2019 | Kwon |
| 2019/0053294 A1 | 2/2019 | Xia |
| 2019/0075582 A1 | 3/2019 | Kim |
| 2019/0081688 A1 | 3/2019 | Deenoo |
| 2019/0081832 A1 | 3/2019 | Marinier |
| 2019/0109695 A1 | 4/2019 | Kim et al. |
| 2019/0116611 A1 | 4/2019 | Lee |
| 2019/0182821 A1 | 6/2019 | You |
| 2019/0182856 A1 | 6/2019 | Moroga |
| 2019/0229777 A1 | 7/2019 | Guan |
| 2019/0281639 A1 | 9/2019 | Yang |
| 2019/0319686 A1 | 10/2019 | Chen |
| 2019/0349915 A1 | 11/2019 | Ahn |
| 2019/0387501 A1 | 12/2019 | Park |
| 2020/0014453 A1 | 1/2020 | Takeda |
| 2020/0022119 A1 | 1/2020 | Wang |
| 2020/0028609 A1 | 1/2020 | Ahn |
| 2020/0059958 A1 | 2/2020 | Chen |
| 2020/0076492 A1 | 3/2020 | Wu |
| 2020/0099437 A1 | 3/2020 | Harada |
| 2020/0099499 A1 | 3/2020 | Yeo |
| 2020/0186218 A1 | 6/2020 | Wu |
| 2020/0374960 A1 | 11/2020 | Deenoo |
| 2020/0389220 A1 | 12/2020 | Kang |
| 2021/0204346 A1 | 7/2021 | Ye |
| 2021/0235479 A1 | 7/2021 | Tang |
| 2022/0061025 A1 | 2/2022 | Deng |

FOREIGN PATENT DOCUMENTS

| | | |
|---|---|---|
| CN | 106231614 A | 12/2016 |
| CN | 106376050 A | 2/2017 |
| CN | 108633047 | 10/2018 |
| CN | 108809488 | 11/2018 |
| CN | 110062398 | 7/2020 |
| CN | 108923896 A | 3/2021 |
| EP | 2712228 | 3/2014 |
| EP | 2996378 | 3/2016 |
| KR | 20130130593 | 12/2013 |
| WO | 2014074894 | 5/2014 |
| WO | 2014158255 | 10/2014 |
| WO | 2014201638 | 12/2014 |
| WO | 2015113664 | 8/2015 |
| WO | 2015113664 A1 | 8/2015 |
| WO | 2015131494 | 9/2015 |
| WO | 2015199414 | 12/2015 |
| WO | 2016015307 | 2/2016 |
| WO | 2016025899 | 2/2016 |
| WO | 2016122232 | 4/2016 |
| WO | 2016072770 | 5/2016 |
| WO | 2016107518 A1 | 7/2016 |
| WO | 2016122257 | 8/2016 |
| WO | 2016126099 | 8/2016 |
| WO | 2016130175 | 8/2016 |
| WO | 2016130175 A1 | 8/2016 |
| WO | 2016136143 | 9/2016 |
| WO | 2016136143 A1 | 9/2016 |
| WO | 2017/023352 | 2/2017 |
| WO | 2017/024516 | 2/2017 |
| WO | 2017/026983 | 2/2017 |
| WO | 2017023352 A1 | 2/2017 |
| WO | 2017024566 | 2/2017 |
| WO | 2017026983 A1 | 2/2017 |
| WO | 2017/052199 | 3/2017 |
| WO | 2017050184 A1 | 3/2017 |
| WO | 2017052199 A1 | 3/2017 |
| WO | 2017/079530 | 5/2017 |
| WO | 2017/079574 | 5/2017 |
| WO | 2017/083489 | 5/2017 |
| WO | 2017/083514 | 5/2017 |
| WO | 2017/084235 | 5/2017 |
| WO | 2017079530 A1 | 5/2017 |
| WO | 2017079574 A1 | 5/2017 |
| WO | 2017/171398 | 10/2017 |
| WO | 2017/174469 | 10/2017 |
| WO | 2017171398 A1 | 10/2017 |
| WO | 2017174469 A1 | 10/2017 |
| WO | 2018/081913 | 5/2018 |
| WO | 2018081913 A1 | 5/2018 |
| WO | 2018/126401 | 7/2018 |
| WO | 2018126401 A1 | 7/2018 |
| WO | 2018/175809 | 9/2018 |
| WO | 2018/201861 | 11/2018 |
| WO | 2018/202178 | 11/2018 |
| WO | 2018/227464 | 12/2018 |

OTHER PUBLICATIONS

1st Search Report in Application No. 201710255811.X dated Sep. 27, 2020.

Erik Dahlman et al., 4G LTE/LTE-Advanced for Mobile Broadband, 2011.

Frank Schaich et al., Subcarrier Spacing—How to Make Use of This Degree of Freedom, 2016 IEEE 83rd Vehicular Technology Conference.

*Apex Beam Technologies LLC v. Samsung Electronics Co., Ltd. et al.*, Case No. 2:22-cv-00188-JRG, Dkt. No. 1, Complaint for Patent Infringement (E.D. Tex. Jun. 1, 2022).

*Apex Beam Technologies LLC v. Samsung Electronics Co., Ltd et al.*, Case No. 2:22-cv-00188-JRG, Plaintiff's Infringement Contentions Claim Chart for U.S. Pat. No. 10,462,767, Jan. 5, 2023.

(56) References Cited

OTHER PUBLICATIONS

United States District Courts—National Judicial Caseload Profile, (retrieved Feb. 5, 2023).
*Apex Beam Technologies LLC* v. *ZTE Corp.*, No. 2:22-cv-00031-JRG-RSP, Dkt. No. 37, Docket Control Order (E.D. Tex. Feb. 6, 2023).
*Apex Beam Technologies LLC* v. *Samsung Electronics Co., Ltd. et al.*, Case No. 2:22-cv-00188-JRG, Plaintiff's Infringement Contentions Cover Pleading (E.D. Tex. Jan. 5, 2023).
3GPP TS 36.211 v11.3.0 ("Technical Specification Group Radio Access Network; Evolved Universal Terrestrial Radio Access (E-UTRA); Physical Channels and Modulation (Release 11)") (Jun. 2013).
3GPP TS 36.304 v13.0.0 ("Technical Specification Group Radio Access Network; Evolved Universal Terrestrial Radio Access (E-UTRA); User Equipment (UE) procedures in idle mode (Release 13)") (Dec. 2015).
3GPP TS 36.331 v13.0.0 ("Technical Specification Group Radio Access Network; Evolved Universal Terrestrial Radio Access (E-UTRA); Radio Resource Control (RRC); Protocol specification (Release 13)") (Dec. 2015).
3GPP TSG RAN WG1 Meeting #88bis, RI-1704867, Mar. 25, 2017.
3GPP TR 38.802 v14.0.0, Mar. 25, 2017.
3GPP TSG RAN WG1 Meeting #88, RI-1701979, Feb. 6, 2017.
3GPP TSG RAN WG2 #97, RZ-1701727, Feb. 4, 2017.
3GPP TSG RAN WG1 Meeting #86, RI-166881, Aug. 13, 2016.
*Samsung Electronics Co., Ltd., and Samsung Electronics America, Inc.*, v. *Apex Beam Technologies LLC*, Case IPR2023-00598, U.S. Pat. No. 10,462,767, Feb. 28, 2023.
Declaration of Friedhelm Rodermund in support of a petition for inter partes review of Case IPR2023-00598, U.S. Pat. No. 10,462,767, Feb. 27, 2023.
Declaration of Dr. Harry V. Bims in support of a petition for inter partes review, Case IPR2023-00598, U.S. Pat. No. 10,462,767, Feb. 27, 2023.
Decision of Inter Party Review, Case IPR2023-00598, Sep. 14, 2023.
Chinese Notification of Acceptance of Request for Invalidation and its translation, Patent No. 201710255811.X, dated Jan. 3, 2023.
Chinese Decision on invalidation Request and its translation, Patent No. 201710255811X, dated Jun. 2, 2023.
3GPP TSG RAN WG1 Meeting #89, R1-1707475, Discussion on DL beam management, dated May 2017.
3GPP TSG RAN WG1 NR Ad-Hoc#2, R1-1710596, Discussion of beam recovery procedure, dated Jun. 2017.
*Apex Beam Technologies LLC* v. *TCT Mobile International Limited*, Defendants' Motion to Dismiss Plaintiff's First Amended Complaint for Patent Infringement, Case 2:21-cv-00438-JRG Document 32, dated Sep. 14, 2023.
*Apex Beam Technologies LLC* v. *TCT Mobile International Limited*, Plaintiff Apex Beam Technologies LLC's Sur-Reply in Opposition to Defendants' Motion to Dismiss, Case 2:21-cv-00438-JRG Document 39, dated Oct. 13, 2023.
*Apex Beam Technologies LLC* v. *TCT Mobile International Limited*, Defendants' Reply in Support of Defendants' Motion to Dismiss Plaintiff's First Amended Complaint, Case 2:21-cv-00438-JRG Document 34, dated Oct. 6, 2023.
*Apex Beam Technologies LLC* v. *TCT Mobile International Limited*, Plaintiff Apex Beam Technologies LLC's Response in Opposition to Defendants' Motion to Dismiss, Case 2:21-cv-00438-JRG Document 33, dated Sep. 28, 2023.
*Apex Beam Technologies LLC* v. *Samsung Electronics Co., Ltd. et al.*, Samsung Electronics Co., Ltd. and Samsung Electronics America, Inc.'S First Amended Answer to Plaintiff's First Amended Complaint for Patent Infringement, Case 2:22-cv-00031-JRG-RSP Document 63, dated Sep. 28, 2023.
*Apex Beam Technologies LLC* v. *ZTE Corp.*, Plaintiff Apex Beam Technologies LLC's Opening Claim Construction Brief, Case 2:22-cv-00031-JRG-RSP Document 69, dated Nov. 3, 2023.
R1-1610145, Qualcomm, Oct. 1, 2016.
R1-1610239, Nokia, Alcatel-Lucent Shanghai Bell, Sep. 30, 2016.
R1-1611385, China Academy of Telecommunications Technology (CATT), Nov. 5, 2016.
R1-1611415, ZTE, ZTE Microelectronics, Nov. 5, 2016.
R1-1611417, ZTE, ZTE Microelectronics, Nov. 5, 2016.
R1-1612056, Qualcomm, Nov. 5, 2016.
R1-1612493, Samsung, Nov. 4, 2016.
R1-1612862, Nokia, Alcatel-Lucent Shanghai Bell, Nov. 4, 2016.
R4-161779, Qualcomm Incorporated, Apr. 26, 2016.
3GPP TR 36.897 V13.0.0 Release 13, 3rd Generation Partnership Project (3GPP), Jun. 2015.
R1-1704867, LG Electronics, Mar. 25, 2017.
R1-1609662, Nokia, Alcatel-Lucent Shanghai Bell, Sep. 30, 2016.
R2-1703344, LG Electronics, Mar. 24, 2017.
3GPP R1-1704398, Apr. 7, 2017.
3GPP R1-1704877, Apr. 7, 2017.
R1-1609256, Oct. 14, 2016.
*Apex Beam Technologies LLC* v. *Oneplus Technology (Shenzhen) Co., Ltd.*, Defendant's Invalidity Contentions, Case No. 2:22-cv-00032-JRG, Nov. 21, 2022.
*Apex Beam Technologies LLC* v. *Samsung Electronics Co., Ltd., et al.,*, Defendant's Invalidity Contentions, Case No. 2:22-cv-00188-JRG, Mar. 2, 2023.
*Apex Beam Technologies LLC* v. *ZTE Corporation*, Defendant's Invalidity Contentions, Case No. 2:22-cv-00031-JRG-RSP, Mar. 2, 2023.
*Apex Beam Technologies LLC* v. *TCT Mobile International Limited*, Defendants' Initial Invalidity Contentions, Docket No. 2:21-cv-00438-JRG, Nov. 9, 2023.
*Samsung Electronics Co., Ltd., and Samsung Electronics America, Inc.*, v. *Apex Beam Technologies LLC*, Petition for Inter Partes Review, Case IPR2023-0059, Feb. 28, 2023.
R1-1710596, Lenovo, Motorola Mobility, dated Jun. 27-30, 2017 (Meeting dates) Jun. 16, 2017 (Publication).
R1-1710810, MediaTek Inc., dated Jun. 27-30, 2017 (Meeting dates) Jun. 17, 2017 (Publication).
R1-1710871, InterDigital Inc., dated Jun. 20-27, 2017 (Meeting date) Jun. 16, 2017 (Publication).
R1-1711161, Qualcomm Incorporated, dated Jun. 27-30, 2017 (Meeting dates) Jun. 17, 2017 (Publication).
R2-1700902, Ericsson, dated Feb. 13-17, 2017 (Meeting date) Feb. 4, 2017 (Publication).
R2-1701727, Intel Corporation, dated Feb. 13-17, 2017 (Meeting date) Feb. 4, 2017 (Publication).
R2-1702662, Ericsson, dated Apr. 3-7, 2017 (Meeting dates) Mar. 25, 2017 (Publication).
R2-1703344, LG Electronics, dated Apr. 3-7, 2017 (Meeting date) Mar. 24, 2017 (Publication).
R2-1703561, Qualcomm Incorporated, dated Apr. 3-7, 2017 (Meeting dates) Mar. 25, 2017 (Publication).
R2-1706926, Qualcomm Incorporated, dated Jun. 27-29, 2017 (Meeting dates) Jun. 17, 2017 (Publication).
R4-161779, Qualcomm Incorporated, dated Apr. 11-15, 2016 (Meeting date) Apr. 26, 2016 (Publication).
SINR, RSRP, RSSI and RSRQ Measurements in Long Term Evolution Networks, Farhana Afroz, dated Aug. 2015.
Subcarrier Spacing—How to Make Use of This Degree of Freedom, Frank Schaich, dated Jul. 7, 2016.
Waveform and Numerology to Support 5G Services and Requirements, Ali A. Zaidi, dated Nov. 1, 2016.
Weight Control Scheme for MIMO System with Multiple Transmit and Receive Beamforming, Yoshitaka Hara, dated 2003.
R2-1701727, Intel Corporation, dated Feb. 4, 2017.
R1-1701979, NEC Corporation, Feb. 6, 2017.
R1-166881, LG Electronics, Aug. 13, 2016.
3GPP TR 38.802 V14.0.0 to Radio Access Technology, 3rd Generation Partnership Project, Mar. 2017.
R1-1701581, ZTE Corporation et al., Feb. 7, 2017.
R1-1708135, Huawei Technologies Co., Ltd. et al., May 6, 2017.
R1-1704465, MediaTek Inc., Mar. 25, 2017.
R1-1707782, Spreadtrum Communications, May 5, 2017.
R1-1705961, Nokia Corporation et al., Mar. 24, 2017.

(56) References Cited

OTHER PUBLICATIONS

R1-1707475, China Academy of Telecommunications Technology (CATT), May 6, 2017.
R1-1700539, Panasonic, Jan. 10, 2017.
R1-1704618, Guangdong OPPO Mobile Telecom, Mar. 25, 2017.
R1-1707830, MediaTek Inc., May 7, 2017.
R1-1708334, InterDigital, Inc., May 6, 2017.
3GPP TS 36.211 version 14.2.0 Release 14 ("TS 36.211"), 3rd Generation Partnership Project (3GPP), Apr. 2017.
3GPP TS 36.212 version 14.2.0 Release 14 ("TS 36.212"), 3rd Generation Partnership Project (3GPP), Apr. 2017.
3GPP TS 36.306 version 14.2.0 Release 14 ("TS 36.306"), 3rd Generation Partnership Project (3GPP), Apr. 2017.
3GPP TS 36.331 version 13.5.0 Release 13 ("TS 36.331"), 3rd Generation Partnership Project (3GPP), Apr. 2017.
3G Evolution: HSPA and LTE for Mobile Broadband ("Dahlman 2007"), Dahlman et al., 2007.
4G: LTE / LTE-Advanced for Mobil Broadband ("Dahlman 2011"), Dahlman et al., 2011.
R1-1611421, ZTE, ZTE Microelectronics, Nov. 5, 2016.
R1-1613589, Samsung, Ericsson, NTT DOCOMO, Intel, Verizon, KT, Nov. 19, 2016.
R1-1612190, China Mobile Communications Corporation (CMCC), Nov. 5, 2016.
R1-1609080, Samsung, Sep. 30, 2016.
R1-1702676, Ericsson, Feb. 7, 2017.
R1-1704456, MediaTek Inc., Mar. 25, 2017.
R1-1704551, China Academy of Telecommunications Technology (CATT), Mar. 25, 2017.
R1-1613716, ZTE, ZTE Microelectronics, Nov. 19, 2016.
R1-1707954, Samsung, May 6, 2017.
R1-1710871, InterDigital Inc., Jun. 16, 2017.
R1-151535, LG Electronics, Apr. 11, 2015.
R1-153175, Ericsson, May 16, 2015.
R1-154127, Samsung, Aug. 14, 2015.
R1-1609525, Intel Corporation, Oct. 1, 2016.
3G Evolution: HSPA and LTE for Mobile Broadband, 2007, Erik Dahlman, Stefan Parkvall, Johan Skold, Per Beming dated.
3GPP TR 25.892 version 6.0.0 release 6, Jun. 28, 2004, 3rd Generation Partnership Project (3GPP) 3rd Generation.
3GPP TR 36.873 version 12.2.0 release 12, Jul. 3, 2015, 3rd Generation Partnership Project (3GPP) 3rd Generation.
3GPP TR 36.897 version 13.0.0 release 13, Jul. 3, 2015, 3rd Generation Partnership Project (3GPP) 3rd Generation.
3GPP TR 37.840 version 12.1.0 release 12, Jan. 6, 2014, 3rd Generation Partnership Project (3GPP) 3rd Generation.
3GPP TR 38.802 version 1.2.0 release 14, Mar. 1, 2017, 3rd Generation Partnership Project (3GPP) 3rd Generation.
3GPP TR 38.802 version 14.0.0 release 14, Mar. 25, 2017, 3rd Generation Partnership Project (3GPP) Author(s).
3GPP TS 36.133 version 12.8.0 release 12, 3rd Generation Partnership Project (3GPP), dated Sep. 9, 2015.
3GPP TS 36.133 version 13.2.0 release 13, 3rd Generation Partnership Project (3GPP), dated Jan. 8, 2016.
3GPP TS 36.211 version 12.3.0 release 12, 3rd Generation Partnership Project (3GPP), dated Oct. 2, 2014.
3GPP TS 36.211 version 12.5.0 release 12, 3rd Generation Partnership Project (3GPP), dated Mar. 16, 2015.
3GPP TS 36.211 version 12.8.0 release 12, 3rd Generation Partnership Project (3GPP), dated Jan. 26, 2016.
3GPP TS 36.211 version 12.8.0 release 12, 3rd Generation Partnership Project (3GPP), dated Jan. 6, 2016.
3GPP TS 36.211 version 13.2.0 release 13, 3rd Generation Partnership Project (3GPP), dated Aug. 24, 2016.
3GPP TS 36.211 version 14.2.0 release 14, 3rd Generation Partnership Project (3GPP), dated Apr. 18, 2017.
3GPP TS 36.211 version 8.9.0 release 8, 3rd Generation Partnership Project (3GPP), dated Dec. 9, 2009.
3GPP TS 36.211 version 11.3.0 release 11, 3rd Generation Partnership Project (3GPP), dated Jun. 26, 2013.
3GPP TS 36.211 version 13.0.0 release 13, 3rd Generation Partnership Project (3GPP), dated Jan. 5, 2016.
3GPP TS 36.212 version 12.2.0 release 12, 3rd Generation Partnership Project (3GPP), dated Sep. 23, 2014.
3GPP TS 36.212 version 12.2.0 release 12, 3rd Generation Partnership Project (3GPP), dated Oct. 2, 2014.
3GPP TS 36.212 version 12.4.0 release 12, 3rd Generation Partnership Project (3GPP), dated Mar. 18, 2015.
3GPP TS 36.212 version 12.8.0 release 12, 3rd Generation Partnership Project (3GPP), dated Mar. 27, 2016.
3GPP TS 36.212 version 12.8.0 release 12, 3rd Generation Partnership Project (3GPP), dated Apr. 22, 2016.
3GPP TS 36.212 version 13.0.0 release 13, 3rd Generation Partnership Project (3GPP), dated Jan. 5, 2016.
3GPP TS 36.212 version 13.3.0 release 13, 3rd Generation Partnership Project (3GPP), dated Sep. 29, 2016.
3GPP TS 36.212 version 14.2.0 release 14, 3rd Generation Partnership Project (3GPP), dated Apr. 11, 2017.
3GPP TS 36.213 version 12.11.0 release 12, 3rd Generation Partnership Project (3GPP), dated Sep. 29, 2016.
3GPP TS 36.213 version 12.3.0 release 12, 3rd Generation Partnership Project (3GPP), dated Oct. 2, 2014.
3GPP TS 36.213 version 12.8.0 release 12, Project (3GPP) ETSI publication of 3rd Generation, dated May 3, 2016.
3GPP TS 36.213 version 12.8.0 release 12 Annex A, 3rd Generation Partnership Project (3GPP), dated Jan. 6, 2016.
3GPP TS 36.213 version 12.8.0 release 12, Cover, 3rd Generation Partnership Project (3GPP), dated Jan. 6, 2016.
3GPP TS 36.213 version 12.8.0 release 12, Section 14, 3rd Generation Partnership Project (3GPP), dated Jan. 6, 2016.
3GPP TS 36.213 version 12.8.0 release 12, Sections 0-9, 3rd Generation Partnership Project (3GPP), dated Jan. 6, 2016.
3GPP TS 36.213 version 12.8.0 release 12, Sections 10-13, 3rd Generation Partnership Project (3GPP), dated Jan. 6, 2016.
3GPP TS 36.213 version 13.0.0 release 13, 3rd Generation Partnership Project (3GPP), dated Jan. 5, 2016.
3GPP TS 36.213 version 13.2.0 release 13, 3rd Generation Partnership Project (3GPP), dated Aug. 5, 2016.
3GPP TS 36.214 version 12.0.0 release 12, 3rd Generation Partnership Project (3GPP), dated Oct. 2, 2014.
3GPP TS 36.214 version 12.2.0 release 12, 3rd Generation Partnership Project (3GPP), dated Apr. 24, 2015.
3GPP TS 36.214 version 13.0.0 release 13, 3rd Generation Partnership Project (3GPP), dated Dec. 15, 2015.
3GPP TS 36.300 version 12.3.0 release 12, 3rd Generation Partnership Project (3GPP), dated Sep. 29, 2014.
3GPP TS 36.300 version 12.8.0 release 12, 3rd Generation Partnership Project (3GPP), dated Jan. 4, 2016.
3GPP TS 36.300 version 12.8.0 release 12, 3rd Generation Partnership Project (3GPP), dated Jan. 18, 2016.
3GPP TS 36.300 version 14.3.0 release 14, Project (3GPP) ETSI publication of 3rd Generation, dated Jul. 27, 2017.
3GPP TS 36.302 version 12.1.0 release 12, 3rd Generation Partnership Project (3GPP), dated Sep. 29, 2014.
3GPP TS 36.302 version 12.6.0 release 12, 3rd Generation Partnership Project (3GPP), dated Jan. 18, 2016.
3GPP TS 36.304 version 12.2.0 release 12, 3rd Generation Partnership Project (3GPP), dated Sep. 29, 2014.
3GPP TS 36.304 version 12.8.0 release 12, 3rd Generation Partnership Project (3GPP), dated Aug. 25, 2016.
3GPP TS 36.304 version 12.8.0 release 12, Project (3GPP) 3rd Generation Partnership, dated Jul. 1, 2016.
3GPP TS 36.304 version 14.0.0 release 14, 3rd Generation Partnership Project (3GPP), dated Oct. 3, 2016.
3GPP TS 36.304 version 9.1.0 Release 9, 3rd Generation Partnership Project (3GPP), dated Feb. 9, 2010.
3GPP TS 36.306 version 14.2.0 release 14, 3rd Generation Partnership Project (3GPP), dated Apr. 11, 2017.
3GPP TS 36.321 version 12.3.0 release 12, 3rd Generation Partnership Project (3GPP), dated Oct. 28, 2014.
3GPP TS 36.321 version 12.6.0 release 12, 3rd Generation Partnership Project (3GPP), dated Jun. 30, 2015.

(56) References Cited

OTHER PUBLICATIONS

3GPP TS 36.321 version 12.8.0 release 12, 3rd Generation Partnership Project (3GPP), dated Jan. 4, 2016.
3GPP TS 36.321 version 12.8.0 release 12, 3rd Generation Partnership Project (3GPP), dated Jan. 18, 2016.
3GPP TS 36.321 version 14.3.0 release 14, Project (3GPP) ETSI publication of 3rd Generation, dated Jul. 27, 2017.
3GPP TS 36.331 version 12.3.0 release 12, 3rd Generation Partnership Project (3GPP), dated Sep. 29, 2014.
3GPP TS 36.331 version 12.8.0 release 12, 3rd Generation Partnership Project (3GPP), dated Jan. 18, 2016.
3GPP TS 36.331 version 13.0.0 release 13, 3rd Generation Partnership Project (3GPP), dated Jan. 6, 2016.
3GPP TS 36.331 version 13.3.0 release 13, 3rd Generation Partnership Project (3GPP), dated Oct. 3, 2016.
3GPP TS 36.331 version 13.5.0 release 13, 3rd Generation Partnership Project (3GPP), dated Apr. 11, 2017.
3GPP TS 38.212 version 15.2.0 release 15, 3rd Generation Partnership Project (3GPP), dated Jun. 29, 2018.
3GPP TS 38.214 version 15.2.0 release 15, 3rd Generation Partnership Project (3GPP), dated Jun. 29, 2018.
3GPP TS 38.306 version 15.5.0 release 15, 3rd Generation Partnership Project (3GPP), dated Apr. 11, 2019.
3GPP TS 36.304 version 13.0.0 release 13, 3rd Generation Partnership Project (3GPP), dated Feb. 2, 2016.
3GPP TS 36.331 version 12.8.0 release 12, 3rd Generation Partnership Project (3GPP), dated Jan. 4, 2016.
4G LTE/LTE Advanced for Mobile Broadband, Erik Dahlman, dated 2011.
4G LTE/LTE Advanced for Mobile Broadband, Erik Dahlman, dated 2014.
1st 5G Algorithm Innovation Competition—Filtered-OFDM, Terasic Inc., dated 2015.
A Comparison of Symbol-wise and Self-contained Frame Structure for 5G Services, Mohamed Ibrahim, dated 2016.
Accurate Determination of Transport Block Size for 5G New Radio, Hao Wu, dated Apr. 30, 2020.
An Enhanced Multiantenna Solution through Beamforming to 3G Long-term Evolution, Ken Long, dated 2009.
Antenna Grouping based Feedback Compression for FDD-based Massive MIMO Systems, Byungju Lee, dated Jul. 21, 2015.
Antenna Grouping Techniques for MIMO Beamforming Systems, Kyungchul Kim, dated 2008.
Beam Selection Strategies for Orthogonal Random Beamforming in Sparse Networks, Jose Lopez Vicario, dated Sep. 2008.
Comparison Between Bit Error Rate And Signal To Noise Ratio in OFDM Using LSE Algorithm, Raghav Pandey, dated 2013.
Delay-Prioritized Scheduling (DPS) for Real Time Traffic in 3GPP LTE System, 2010 Kumbesan Sandrasegaran, dated Apr. 2010.
Dynamic TDD in LTE Small Cells, Jussi Kerttula, dated 2016.
Enabling Massive IoT in 5G and Beyond Systems: PHY Radio Frame Design Considerations, Ayesha Ijaz, dated Jun. 24, 2016.
Enhanced Beam Selection for Multiuser MM-Wave massissive MIMO Systems, Jiaxuan Chen, dated Jul. 7, 2016.
Filtered-OFDM: Foundational Waveform for Selfadaptive Air Interface, Terasic Inc., dated 2015.
Joint Transmitter-Receiver Beamforming Over Space-Time Fading Channels, T. Zhang, A. Manikas, dated 2007.
LTE—The UMTS Long Term Evolution from Theory to Practice, Second Edition, Stefania Sesia, dated 2011.
Millimeter Wave Communications for Future Mobile Networks, Ming Xiao, dated May 17, 2017.
MIMO Beamforming for High-Bit-Rate Transmission over Frequency-Selective Fading Channels, Huy Hoang Pham, dated 2004.
Multibeam Selection for Indoor MIMO Systems: Two Cases of Study, Luis Gurrieri, dated Apr. 2007.
Overview of Full-Dimension MIMO in LTE-Advanced Pro, Hyoungju Ji, dated Aug. 10, 2016.
Overview of Narrowband IoT in LTE Rel-13, Rapeepat Ratasuk, dated 2016.
Novel OFDM transmission scheme to overcome caused by multipath delay longer than cyclic prefix, Chiwoo Lim, dated 2005.
R1-130140, ZTE, dated Jan. 28-Feb. 1, 2013 (Meeting dates) Jan. 19, 2013 (Publication).
R1-130269, LG Electronics, dated Jan. 28-Feb. 1, 2013 (Meeting dates) Jan. 18, 2013 (Publication).
R1-144047, LG Electronics, dated Oct. 6-10, 2014 (Meeting dates) Sep. 27, 2014 (Publication).
R1-150779, LG Electronics, ETRI, InterDigital, Qualcomm, Sony Coorperation, dated Feb. 9-13, 2015 (Meeting dates) Feb. 19, 2015 (Publication).
R1-151365, CATT, dated Apr. 20-24, 2015 (Meeting dates) Apr. 11, 2015 (Publication).
R1-151535, LG Electronics, dated Apr. 20-24, 2015 (Meeting date) Apr. 11, 2015 (Publication).
R1-153175, Ericsson, dated May 25-29, 2015 (Meeting date) May 16, 2015 (Publication).
R1-154127, Samsung, dated Aug. 24-28, 2015 (Meeting date) Aug. 14, 2015 (Publication).
R1-1608671, ZTE, ZTE Microelectronics, dated Oct. 10-14, 2016 (Meeting dates) Oct. 1, 2016 (Publication).
R1-1609080, Samsung, dated Oct. 10-14, 2016 (Meeting dates) Sep. 30, 2016 (Publication).
R1-1609414, Huawei, HiSilicon, dated Oct. 10-14, 2016 (Meeting dates) Oct. 1, 2016 (Publication).
R1-1609525, Intel Corporation, dated Oct. 10-14, 2016 (Meeting date) Oct. 1, 2016 (Publication).
R1-1609662, Nokia, Alcatel-Lucent Shanghai Bell, dated Oct. 10-14, 2016 (Meeting date) Sep. 30, 2016 (Publication).
R1-1609739, Nokia, Alcatel-Lucent Shanghai Bell, dated Oct. 10-14, 2016 (Meeting dates) Oct. 1, 2016 (Publication).
R1-1610145, Qualcomm, dated Oct. 10-14, 2016 (Meeting date) Oct. 1, 2016 (Publication).
R1-1610239, Nokia, Alcatel-Lucent Shanghai Bell, dated Oct. 10-14, 2016 (Meeting date) Sep. 30, 2016 (Publication).
R1-1611385, CATT, dated Nov. 14-18, 2016 (Meeting date) Nov. 5, 2016 (Publication).
R1-1611387, CATT, dated Nov. 14-18, 2016 (Meeting dates) Nov. 5, 2016 (Publication).
R1-1611415, ZTE, ZTE Microelectronics, dated Nov. 14-18, 2016 (Meeting date) Nov. 5, 2016 (Publication).
R1-1611417, ZTE, ZTE Microelectronics, dated Nov. 14-18, 2016 (Meeting date) Nov. 5, 2016 (Publication).
R1-1611421, ZTE, ZTE Microelectronics, dated Nov. 14-18, 2016 (Meeting date) Nov. 5, 2016 (Publication).
R1-1612015, Qualcomm, dated Nov. 14-18, 2016 (Meeting dates) Nov. 6, 2016 (Publication).
R1-1612056, Qualcomm, dated Nov. 14-18, 2016 (Meeting dates) Nov. 6, 2016 (Publication).
R1-1612190, CMCC, dated Nov. 14-18, 2016 (Meeting dates) Nov. 6, 2016 (Publication).
R1-1612493, Samsung, dated Nov. 14-18, 2016 (Meeting date) Nov. 4, 2016 (Publication).
R1-1612717, NTT DOCOMO, dated Nov. 14-18, 2016 (Meeting dates) Nov. 5, 2016 (Publication).
R1-1612862, Nokia, Alcatel-Lucent Shanghai Bell, dated Nov. 14-18, 2016 (Meeting date) Nov. 4, 2016 (Publication).
R1-1613589, Samsung, Ericsson, NTT DOCOMO, Intel, Verizon, KT, dated 14-18, 2016 (Meeting dates) Nov. 19, 2016 (Publication).
R1-1613716, ZTE, ZTE Microelectronics, dated Nov. 14-18, 2016 (Meeting date) Nov. 19, 2016 (Publication).
R1-164147, Intel Corporation, dated May 23-27, 2016 (Meeting dates) May 14, 2016 (Publication).
R1-166881, LG Electronics, dated Aug. 22-26, 2016 (Meeting dates) Aug. 13, 2016 (Publication).
R1-167028, KT Corp., dated Aug. 22-26, 2016 (Meeting dates) Aug. 12, 2016 (Publication).
R1-167287, Nokia, Alcatel-Lucent Shanghai Bell, dated Aug. 22-26, 2016 (Meeting dates) Aug. 12, 2016 (Publication).
R1-167520, Lenovo, dated Aug. 22-26, 2016 (Meeting dates) Aug. 12, 2016 (Publication).
R1-1700192, CATT, dated Jan. 16-20, 2017 (Meeting dates) Jan. 10, 2017 (Publication).

(56) References Cited

OTHER PUBLICATIONS

R1-1700539, Panasonic, Jan. 16-20, 2017 (Meeting dates) Jan. 10, 2017 (Publication).
R1-1700563, Guangdong OPPO Mobile Telecom, dated Jan. 16-20, 2017 (Meeting dates) Jan. 9, 2017 (Publication).
R1-1700703, InterDigital Communications, dated Jan. 16-20, 2017 (Meeting dates) Jan. 10, 2017 (Publication).
R1-1700771, Ericsson, dated Jan. 16-20, 2017 (Meeting dates) Jan. 10, 2017 (Publication).
R1-1701581, ZTE, ZTE Microelectronics, dated Jan. 13-17, 2017 (Meeting dates) Feb. 7, 2017 (Publication).
R1-1701979, NEC, dated Feb. 13-17, 2017 (Meeting date) Feb. 4, 2017 (Publication).
R1-1702676, Ericsson, dated Feb. 13-17, 2017 (Meeting dates) Feb. 7, 2017 (Publication).
R1-1704342, AT&T, dated Apr. 3-7, 2017 (Meeting dates) Mar. 25, 2017 (Publication).
R1-1704456, MediaTek Inc., dated Apr. 3-7, 2017 (Meeting dates) Mar. 25, 2017 (Publication).
R1-1704465, MediaTek Inc., dated Apr. 3-7, 2017 (Meeting dates) Mar. 25, 2017 (Publication).
R1-1704551, CATT, dated Apr. 3-7, 2017 (Meeting date) Mar. 25, 2017 (Publication).
R1-1704553, CATT, dated Apr. 3-7, 2017 (Meeting date) Mar. 25, 2017 (Publication).
R1-1704618, Guangdong OPPO Mobile Telecom, dated Apr. 3-7, 2017 (Meeting dates) Mar. 25, 2017 (Publication).
R1-1704867, LG Electronics, dated Apr. 3-7, 2017 (Meeting date) Mar. 25, 2017 (Publication).
R1-1705961, Nokia, Alcatel-Lucent Shanghai Bell, dated Apr. 3-7, 2017 (Meeting dates) Mar. 24, 2017 (Publication).
R1-1707475, CATT, dated May 15-19, 2017 (Meeting date) May 6, 2017 (Publication).
R1-1707782, Spreadtrum Communications, dated May 15-19, 2017 (Meeting dates) May 5, 2017 (Publication).
R1-1707830, MediaTek Inc., dated May 15-19, 2017 (Meeting dates) May 7, 2017 (Publication).
R1-1707832, MediaTek Inc., dated May 15-19, 2017 (Meeting dates) May 7, 2017 (Publication).
R1-1707954, Samsung, dated May 15-19, 2017 (Meeting dates) May 6, 2017 (Publication).
R1-1708135, Huawei, HiSilicon, dated May 15-19, 2017 (Meeting dates) May 6, 2017 (Publication).
R1-1708334, InterDigital, Inc., dated May 15-19, 2017 (Meeting dates) May 6, 2017 (Publication).
R1-1708336, InterDigital, Inc., dated May 15-19, 2017 (Meeting dates) May 6, 2017 (Publication).
R1-1710078, CATT, dated Jun. 27-30, 2017 (Meeting dates) Jun. 17, 2017 (Publication).

* cited by examiner

|  | Index of X=1 time interval in the first time window ||||
|---|---|---|---|---|
|  | Feature ID=a | Feature ID=b | Feature ID=c | Feature ID=d |
| Y=1 | 0 | 0 | 0 | 0 |
| Y=2 | 0 | 1 | 0 | 1 |
| Y=4 | 0 | 1 | 2 | 3 |
| Y=8 | 1 | 3 | 5 | 7 |
| Y=16 | 2 | 6 | 10 | 14 |

METHOD AND DEVICE IN UE AND BASE STATION USED FOR PAGING

CROSS-REFERENCE TO RELATED APPLICATIONS

This disclosure is a continuation of the application Ser. No. 17/180,885 (issued as U.S. Pat. No. 11,457,426), filed on Feb. 22, 2021, which is the continuation of the application Ser. No. 16/577,854 (issued as U.S. Pat. No. 10,966,178), filed on Sep. 20, 2019, which is the continuation of the application Ser. No. 15/956,742 (issued as U.S. Pat. No. 10,462,767), filed on Apr. 18, 2018, and claims the priority benefit of Chinese Patent Application 201710255811.X, filed on Apr. 19, 2017, all of which are incorporated herein by reference.

BACKGROUND

Technical Field

The present disclosure relates to transmission schemes in wireless communication systems, and in particular to a method and a device for paging transmission in a communication system supporting multiple numerologies.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR). The working item of 5G NR was agreed as an approved project to standardize the 5G NR at the 3GPP RAN #75 session.

In order to be applied to various different application scenarios flexibly, future wireless communication systems, especially 5G NR, will support various numerologies. The various numerologies refer to various subcarrier spacings, various symbol time lengths, various Cyclic Prefix (CP) lengths, etc. In order to simplify the design of systems and to reduce the complexity of User Equipment (UE) implementation, the overall design of the system physical layer would best adopt a unified structure for different numerologies.

SUMMARY

In existing LTE systems, transmission opportunities of paging are defined through a Paging Frame (PF) and a Paging Occasion (PO) uniformly. The PF is a radio frame which is likely to transmit a paging message, and the PO is used for determining a subframe which is likely to transmit a paging message in the PF. The radio frame in LTE has a fixed time length of 10 milliseconds, and the subframe has a fixed time length of 1 millisecond. Since an LTE network generally employs a single numerology or the numerology basically does not change in a long time in the network, the definition of the possible time of paging using the PF and PO having a fixed time length can simplify the design of system, under the premise of guaranteeing the paging capacity and not increasing the power consumption of UE. Under the 5G NR, a network supports different numerologies, thus, a given time length, for example, 1 millisecond, probably includes multiple basic scheduling units (for example, slot). If the legacy design of the current paging opportunity is employed, the UE would detect the paging message different times for different numerologies within the 1 millisecond. Therefore, power consumption in some numerology would be greatly increased. Meanwhile, the paging capacity varies greatly due to the adoption of different numerologies.

In order to solve the above design problem of paging when multiple numerologies are employed in the 5G NR, the present disclosure provides a solution, which determines the transmission opportunities of paging according to the numerology employed by the paging, thereby guaranteeing that the UE has a small difference in the complexity and power consumption of monitoring the paging message under different numerologies and that the paging capacity basically remains the same. It should be noted the embodiments of the UE of the present disclosure and the characteristics in the embodiments may be applied to the base station if no conflict is caused, and vice versa. Further, the embodiments of the present disclosure and the characteristics in the embodiments may be mutually combined if no conflict is caused.

The present disclosure discloses a method in a UE used for paging. The method includes the following:
monitoring a first signaling in X time intervals; and
receiving a first radio signal.

Herein, X is a positive integer. The first signaling is used for determining scheduling information for the first radio signal. The scheduling information includes at least one of {occupied time-frequency resource, adopted Modulation Coding Scheme (MCS), subcarrier spacing of subcarriers in occupied frequency domain resource}. The first radio signal carries a paging message. The frequency domain resource used for transmitting the first signaling belongs to a first subband. The first subband includes a positive integer number of consecutive subcarriers in frequency domain. At least one of {location of the first subband in frequency domain, subcarrier spacing of subcarriers included in the first subband} is used for determining the X time intervals.

In one embodiment, with the above method, the UE can determine the time interval of monitoring a transmitted paging message according to a subcarrier spacing adopted to transmit the paging message, thereby saving power consumption.

In one embodiment, the above method designs a uniform calculation approach of paging opportunity based on different subcarrier spacings. Meanwhile, the paging capacity remains the same when different subcarrier spacings are adopted to transmit the paging message.

In one embodiment, the paging message includes a feature ID of a paged UE.

In one embodiment, the first signaling is detected P times at most in each one of the X time intervals, P is a positive integer.

In one embodiment, any two of the X time intervals have an equal time length.

In one embodiment, two of the X time times have different time lengths.

In one embodiment, any one of the X time intervals is a slot.

In one embodiment, any two of the X time intervals have an equal time length, and the time length of each one of the X time intervals is correlated to the subcarrier spacing of subcarriers included in the first subband.

In one embodiment, any one of the X time intervals comprises M Orthogonal Frequency Division Multiplexing (OFDM) symbols, M is a positive integer smaller than 14.

In one embodiment, any one of the X time intervals comprises M OFDM symbols, M is a positive integer smaller than 7.

In one embodiment, any two of the X time intervals are orthogonal in time domain, the orthogonality refers that there is no time unit that belongs to any two of the X time intervals simultaneously.

In one embodiment, two of the X time intervals are discrete in time domain.

In one embodiment, the first signaling is a physical layer signaling.

In one embodiment, the first signaling is Downlink Control Information (DCI).

In one embodiment, the first signaling is transmitted through a Physical Downlink Control Channel (PDCCH).

In one embodiment, the first signaling is transmitted through a New Radio Physical Downlink Control Channel (NR-PDCCH).

In one embodiment, the first signaling is transmitted through a PDCCH. The PDCCH is transmitted in a Common Search Space (CSS).

In one embodiment, the first signaling is transmitted through a PDCCH, the PDCCH is transmitted in a UE-Specific Search Space (USS).

In one embodiment, the first signaling is transmitted through a PDCCH, the PDCCH has a Cyclic Redundancy Check (CRC) scrambled by a Paging Radio Network Temporary Identity (P-RNTI).

In one embodiment, the MCS includes one of {QPSK, 16QAM, 64QAM, 256QAM, 1024QAM}.

In one embodiment, the subcarrier spacing is equal to 15 kHz multiplied by 2 to the Kth power, where K is an integer.

In one embodiment, the first subband includes a positive integer multiple of 12 subcarriers.

In one embodiment, all subcarriers included in the first subband have an equal subcarrier spacing.

In one embodiment, the location of the first subband in frequency domain refers to the location of the first subband in a carrier where the first subband is located.

In one embodiment, the location of the first subband in frequency domain refers to the location of a carrier where the first subband is located in frequency domain.

In one embodiment, the location of the first subband in frequency domain refers to a subband index of the first subband in a carrier where the first subband is located.

In one embodiment, the location of the first subband in frequency domain refers to the location of the first subband in a frequency resource corresponding to a band where the first subband is located.

In one embodiment, at least one of {location of the first subband in frequency domain, subcarrier spacing of subcarriers included in the first subband} is used for the UE to determine the X time intervals.

In one embodiment, at least one of {location of the first subband in frequency domain, subcarrier spacing of subcarriers included in the first subband} is used for the UE to determine the X time intervals based on a given mapping rule.

In one embodiment, the first radio signal is transmitted through a Downlink Shared Channel (DL-SCH).

In one embodiment, the first radio signal is transmitted through a Physical Downlink Shared Channel (PDSCH).

In one embodiment, a first bit block is subjected to a modulation mapper, a layer mapper, precoding, a resource element mapper and OFDM single generation in sequence to obtain the first radio signal; the first bit block includes the output obtained after a code block is subjected to channel coding. In one subembodiment, the code block is a Transport Block (TB). In one subembodiment, the code block is one part of a TB.

According to one aspect of the present disclosure, the above method is characterized in that any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; A feature ID of a monitor of the first signaling is used for determining the X time intervals in the Y time intervals.

In one embodiment, the time length of the first time window is fixed.

In one embodiment, the first time window includes a positive integer number of consecutive multi-carrier symbols.

In one embodiment, the multi-carrier symbol includes a data symbol and a CP.

In one embodiment, the first time window has a time length of 1 millisecond.

In one embodiment, the first time window has a time length of 10 milliseconds.

In one embodiment, the first time window is a subframe.

In one embodiment, the first time window is a radio frame.

In one embodiment, any two of the Y time intervals have an equal time length.

In one embodiment, two of the Y time intervals have different time lengths.

In one embodiment, Y is greater than X.

In one embodiment, Y is proportional to the subcarrier spacing of subcarriers included in the first subband.

In one embodiment, the subcarrier spacing of subcarriers included in the first subband is used for the UE to determine Y.

In one embodiment, the subcarrier spacing of subcarriers included in the first subband is used for the UE to determine Y based on a given mapping relationship.

In one embodiment, the feature ID of the monitor of the first signaling is used for the UE to determine the X time intervals in the Y time intervals.

In one embodiment, the feature ID of the monitor of the first signaling is used for the UE to determine the X time intervals in the Y time intervals based on a given mapping relationship.

In one embodiment, the feature ID refers to an International Mobile Subscriber Identification Number (IMSI).

In one embodiment, the feature ID refers to a remainder when the IMSI is divided by 1024.

In one embodiment, the feature ID refers to a remainder when the IMSI is divided by 4096.

In one embodiment, the feature ID refers to a remainder when the IMSI is divided by 16384.

In one embodiment, the feature ID refers to a Cell Radio Network Temporary Identity (C-RNTI).

In one embodiment, a physical cell ID of a cell transmitting the first signaling is used for determining the X time intervals in the Y time intervals.

According to one aspect of the present disclosure, the above method is characterized in that the first time window belongs to one of Z time windows, Z being an integer greater than 1; Z is predefined, or Z is configurable; Any two of the Z time windows have an equal time length; The feature ID of the monitor of the first signaling is used for determining the first time window in the Z time windows.

In one embodiment, Z is equal to 10.

In one embodiment, any two of the Z time windows are orthogonal in time domain.

In one embodiment, any one of the Z time windows is a subframe, Z is equal to 10, In one embodiment, any one of the Z time windows is a radio frame, Z is equal to the number of radio frames included in a Discontinuous Reception (DRX) cycle.

In one embodiment, the above method further includes the following:

receiving a third signaling.

Herein, the third signaling is used for configuring Z.

In one embodiment, the feature ID of the monitor of the first signaling is used for the UE to determine the first time window in the Z time windows.

In one embodiment, the feature ID of the monitor of the first signaling is used for the UE to determine the first time window in the Z time windows based on a given mapping relationship.

In one embodiment, any one of the Z time windows is a radio frame; The first time window is obtained by the following formula.

$$\text{SFN mod } Z = (Z \text{ div } N) * (\text{UE\_ID mod } N)$$

Herein, SFN is a frame number of a radio frame corresponding to the first time window, N=min(Z,nB), nB is equal to one of {4Z, 2Z, Z, Z/2, Z/4, Z/8, Z/16, Z/32, Z/64, Z/128, Z/256, Z/512, Z/1024}.

According to one aspect of the present disclosure, the above method further includes the following:

receiving a second radio signal;

Herein, the second radio signal is used for determining at least one of {location of the first subband in frequency domain, subcarrier spacing of subcarriers included in the first subband}.

In one embodiment, the second radio signal includes a Primary Synchronization Signal (PSS).

In one embodiment, the second radio signal includes a Second Synchronization Signal (SSS).

In one embodiment, the second radio signal is transmitted through a Broadcast Channel (BCH).

In one embodiment, the second radio signal is transmitted through a Physical Broadcast Channel (PBCH).

In one embodiment, the second radio signal is transmitted through a PDSCH.

In one embodiment, the second radio signal carries Master Information Block (MIB) information.

In one embodiment, the second radio signal carries System Information Block (SIB) information.

In one embodiment, the information carried by the second radio signal is transmitted cyclically.

In one embodiment, the information carried by the second radio signal is transmitted on-demand.

In one embodiment, the second radio signal carries first information; The first information is used for determining at least one of {location of the first subband in frequency domain, subcarrier spacing of subcarriers included in the first subband}.

In one embodiment, the second radio signal carries first information; The first information indicates at least one of {location of the first subband in frequency domain, subcarrier spacing of subcarriers included in the first subband}.

In one embodiment, the second radio signal is used for the UE to determine at least one of {location of the first subband in frequency domain, subcarrier spacing of subcarriers included in the first subband}.

In one embodiment, the second radio signal indicates at least one of {location of the first subband in frequency domain, subcarrier spacing of subcarriers included in the first subband}.

According to one aspect of the present disclosure, the above method further includes the following:

receiving a second signaling;

Herein, the second signaling is used for determining Q subbands, Q being a positive integer; The first subband belongs to one of the Q subbands; Any one of the Q subbands includes a positive integer number of consecutive subcarriers; The feature ID of the monitor of the first signaling is used for determining the first subband in the Q subbands.

In one embodiment, in any one of the Q subbands, all the included subcarriers have an equal subcarrier spacing.

In one embodiment, in any two of the Q subbands, the subcarriers have different subcarrier spacings.

In one embodiment, in two of the Q subbands, the subcarriers have an equal subcarrier spacing.

In one embodiment, any two of the Q subbands have an equal frequency domain width.

In one embodiment, two of the Q subbands have different frequency domain widths.

In one embodiment, the Q subbands all belong to one same carrier.

In one embodiment, two of the Q subbands belong to different carriers.

In one embodiment, the second signaling is a high layer signaling.

In one embodiment, the second signaling is a physical layer signaling.

In one embodiment, the second signaling is transmitted through a BCH.

In one embodiment, the second signaling is transmitted through a PBCH.

In one embodiment, the second signaling is transmitted through a PDSCH.

In one embodiment, the second signaling is a Radio Resource Control (RRC) signaling.

In one embodiment, the second signaling is an SIB.

In one embodiment, the second signaling is transmitted through a DCI.

In one embodiment, the feature ID of the monitor of the first signaling is used for the UE to determine the first subband in the Q subbands.

In one embodiment, the feature ID of the monitor of the first signaling is used for the UE to determine the first subband in the Q subbands based on a specific mapping relationship.

The present disclosure discloses a method in a base station used for paging. The method includes the following:

transmitting a first signaling in a positive integer number of time intervals of X time intervals; and transmitting a first radio signal.

Herein, X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

According to one aspect of the present disclosure, the above method is characterized in that any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; A feature ID of a monitor of the first signaling is used for determining the X time intervals in the Y time intervals.

According to one aspect of the present disclosure, the above method is characterized in that the first time window belongs to one of Z time windows, Z being an integer greater than 1; Z is predefined, or Z is configurable; Any two of the Z time windows have an equal time length; The feature ID of the monitor of the first signaling is used for determining the first time window in the Z time windows.

According to one aspect of the present disclosure, the above method further includes the following:

transmitting a second radio signal;

Herein, the second radio signal is used for determining at least one of {location of the first subband in frequency domain, subcarrier spacing of subcarriers included in the first subband}.

According to one aspect of the present disclosure, the above method further includes the following:

transmitting a second signaling;

Herein, the second signaling is used for determining Q subbands, Q being a positive integer; The first subband belongs to one of the Q subbands; Any one of the Q subbands includes a positive integer number of consecutive subcarriers; The feature ID of the monitor of the first signaling is used for determining the first subband in the Q subbands.

The present disclosure discloses a UE used for paging. The UE includes:

a first receiver module, to monitor a first signaling in X time intervals; and a second receiver module, to receive a first radio signal.

Herein, X is a positive integer. The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

According to one aspect of the present disclosure, the above UE is characterized in that any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; A feature ID of a monitor of the first signaling is used for determining the X time intervals in the Y time intervals.

According to one aspect of the present disclosure, the above UE is characterized in that the first time window belongs to one of Z time windows, Z being an integer greater than 1; Z is predefined, or Z is configurable; Any two of the Z time windows have an equal time length; The feature ID of the monitor of the first signaling is used for determining the first time window in the Z time windows.

According to one aspect of the present disclosure, the above UE is characterized in that the first receiver module further receives a second radio signal; The second radio signal is used for determining at least one of {location of the first subband in frequency domain, subcarrier spacing of subcarriers included in the first subband}.

According to one aspect of the present disclosure, the above UE is characterized in that the first receiver module further receives a second signaling; The second signaling is used for determining Q subbands, Q being a positive integer; The first subband belongs to one of the Q subbands; Any one of the Q subbands includes a positive integer number of consecutive subcarriers; The feature ID of the monitor of the first signaling is used for determining the first subband in the Q subbands.

The present disclosure discloses a base station device used for paging. The base station device includes:

a first transmitter module, to transmit a first signaling in a positive integer number of time intervals of X time intervals respectively; and a second transmitter module, to transmit a first radio signal;

Herein, X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

According to one aspect of the present disclosure, the above base station device is characterized in that any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; A feature ID of a monitor of the first signaling is used for determining the X time intervals in the Y time intervals.

According to one aspect of the present disclosure, the above base station device is characterized in that the first time window belongs to one of Z time windows, Z being an integer greater than 1; Z is predefined, or Z is configurable; Any two of the Z time windows have an equal time length; The feature ID of the monitor of the first signaling is used for determining the first time window in the Z time windows.

According to one aspect of the present disclosure, the above base station device is characterized in that the first transmitter module further transmits a second radio signal; The second radio signal is used for determining at least one of {location of the first subband in frequency domain, subcarrier spacing of subcarriers included in the first subband}.

According to one aspect of the present disclosure, the above base station device is characterized in that the first transmitter module further transmits a second signaling; The second signaling is used for determining Q subbands, Q being a positive integer; The first subband belongs to one of the Q subbands; Any one of the Q subbands includes a positive integer number of consecutive subcarriers; The feature ID of the monitor of the first signaling is used for determining the first subband in the Q subbands.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the disclosure and the characteristics of the embodiments may be arbitrarily combined if there is no conflict.

Embodiment 1

Figure 1:
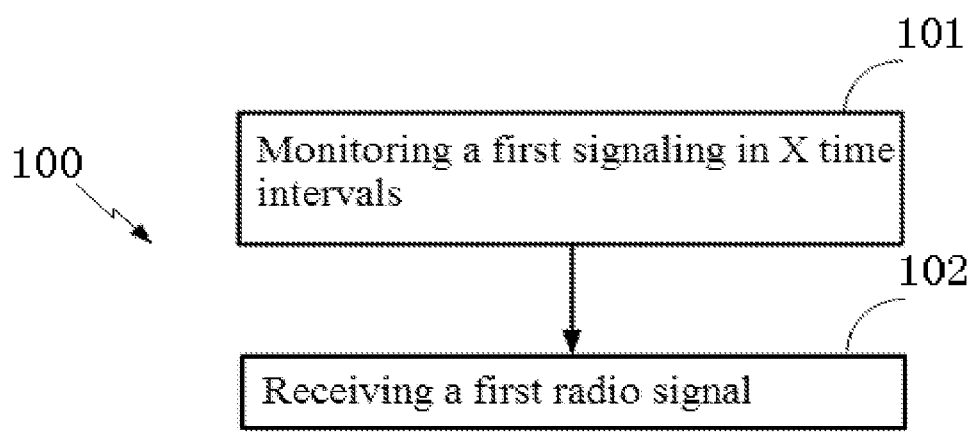
FIG. 1 is a flowchart illustrating the transmission of a first signaling and a first radio signal according to one embodiment of the present disclosure.

Embodiment 1 illustrates an example of a flowchart for the transmission of a first signaling and a first radio signal according to one embodiment of the present disclosure, as shown in FIG. 1. In FIG. 1, each box represents a step. In Embodiment 1, the UE of the present disclosure first monitors a first signaling in X time intervals, and then receives a first radio signal, wherein X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

In one embodiment, any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; A feature ID of a monitor of the first signaling is used for determining the X time intervals in the Y time intervals.

In one embodiment, any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; A feature ID of a monitor of the first signaling is used for determining the X time intervals in the Y time intervals; The first time window belongs to one of Z time windows, Z being an integer greater than 1. Z is predefined, or Z is configurable; Any two of the Z time windows have an equal time length; The feature ID of the monitor of the first signaling is used for determining the first time window in the Z time windows.

In one embodiment, the method further includes the following:

receiving a second radio signal;

Herein, the second radio signal is used for determining at least one of {location of the first subband in frequency domain, subcarrier spacing of subcarriers included in the first subband}.

In one embodiment, the method further includes the following:

receiving a second signaling;

The second signaling is used for determining Q subbands, Q being a positive integer; The first subband belongs to one of the Q subbands; Any one of the Q subbands includes a positive integer number of consecutive subcarriers; The feature ID of the monitor of the first signaling is used for determining the first subband in the Q subbands.

Embodiment 2

Figure 2:
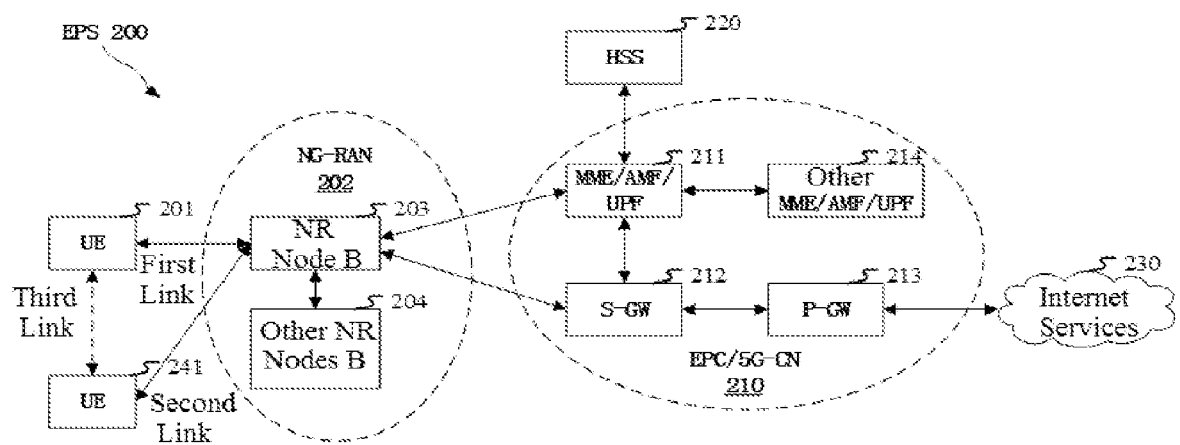
FIG. 2 is a diagram illustrating a network architecture according to one embodiment of the present disclosure.

Embodiment 2 illustrates an example of a diagram for a network architecture, as shown in FIG. 2. FIG. 2 is a diagram illustrating a system network architecture 200 of NR 5G, LTE and Long-Term Evolution Advanced (LTE-A). The NR 5G or LTE network architecture 200 may be called an Evolved Packet System (EPS) 200. The EPS 200 may include one or more UEs 201, a Next Generation-Radio Access Network (NG-RAN) 202, an Evolved Packet Core/ 5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides user plane and control plane protocol terminations towards the UE 201. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or other appropriate terms. The gNB 203 is connected to the EPC/5G-CN 210 via an SUNG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the internet service 230. The internet service 230 includes IP services corresponding to operators, specifically including internet, intranet, IP Multimedia Subsystems (IP IMSs) and PS Streaming Services (PSSs).

In one embodiment, the UE 201 corresponds to the UE in the present disclosure.

In one embodiment, the UE 201 supports the transmission based on multiple numerologies.

In one embodiment, the gNB 203 corresponds to the base station device in the present disclosure.

In one embodiment, the gNB 203 supports the transmission based on multiple numerologies.

Embodiment 3

Figure 3:
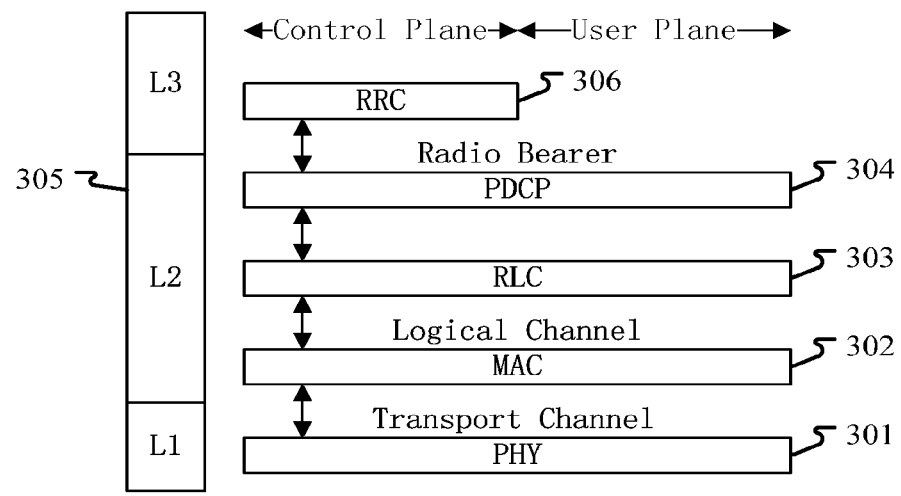
FIG. 3 is a diagram illustrating a radio protocol architecture of a user plane and a control plane according to one embodiment of the present disclosure.

Embodiment 3 is a diagram illustrating an embodiment of a radio protocol architecture of a user plane and a control plane according to the present disclosure, as shown in FIG. 3. FIG. 3 is a diagram illustrating an embodiment of a radio protocol architecture of a user plane and a control plane. In FIG. 3, the radio protocol architecture of a UE and a base station device (gNB or eNB) is presented by three layers, which are a layer 1, a layer 2 and a layer 3 respectively. The layer 1 (L1) is the lowest layer and performs signal processing functions of a PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers end at the gNB of the network side. Although not described in FIG. 3, the UE may include several higher layers above the L2 305, such as network layer (i.e. IP layer) ending at a P-GW of the network side and an application layer ending at the other side of the connection (i.e. a peer UE, a server, etc.). The PDCP sublayer 304 provides multiplexing among variable radio bearers and logical channels. The PDCP sublayer 304 also provides a header compression for a higher layer packet so as to reduce a radio transmission overhead. The PDCP sublayer 304 provides security by encrypting a packet and provides support for UE handover between gNBs. The RLC sublayer 303 provides segmentation and reassembling of a higher layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one embodiment, the radio protocol architecture shown in FIG. 3 is applicable to the UE in the present disclosure.

In one embodiment, the radio protocol architecture shown in FIG. 3 is applicable to the base station device in the present disclosure.

In one embodiment, the first signaling in the present disclosure is generated by the PHY 301.

In one embodiment, the first signaling in the present disclosure is generated by the MAC 302.

In one embodiment, the first signaling in the present disclosure is generated by the RRC 306.

In one embodiment, the second signaling in the present disclosure is generated by the PHY 301.

In one embodiment, the second signaling in the present disclosure is generated by the MAC 302.

In one embodiment, the second signaling in the present disclosure is generated by the RRC 306.

In one embodiment, the first radio signal in the present disclosure is generated by the RRC 306.

In one embodiment, the first radio signal in the present disclosure is generated by the MAC 302.

In one embodiment, the first radio signal in the present disclosure is generated by the PHY 301.

In one embodiment, the second radio signal in the present disclosure is generated by the RRC 306.

In one embodiment, the second radio signal in the present disclosure is generated by the MAC 302.

In one embodiment, the second radio signal in the present disclosure is generated by the PHY 301.

Embodiment 4

Figure 4:
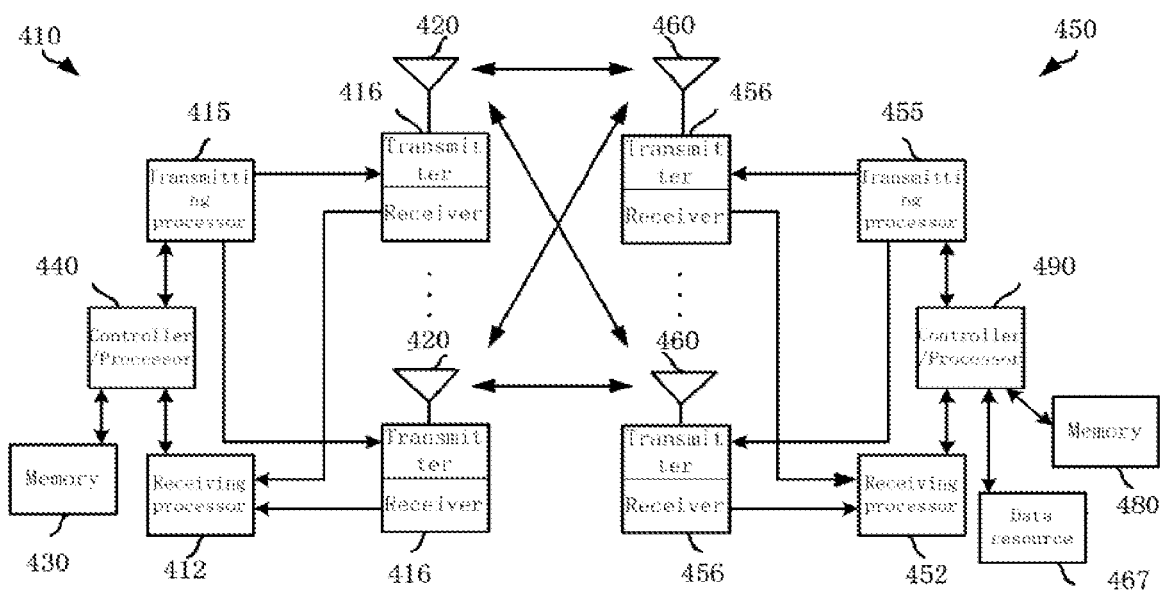
FIG. 4 is a diagram illustrating a base station device and a UE according to one embodiment of the present disclosure.

Embodiment 4 illustrates a diagram of a base station device and a given UE according to the present disclosure, as shown in FIG. 4. FIG. 4 is a block diagram of a gNB 410 in communication with a UE 450 in an access network.

The base station device 410 includes a controller/processor 440, a memory 430, a receiving processor 412, a transmitter/receiver 416 and a transmitting processor 415. The transmitter/receiver 416 includes an antenna 420. A packet from a higher layer is provided to the controller/processor 440. The controller/processor 440 provides header compression/decompression, encryption/decryption, packet segmentation and reordering, multiplexing/de-multiplexing between a logical channel and a transport channel, to implement the L2 protocol used for the user plane and the control plane. The packet from a higher layer may include data or control information, for example, DL-SCH or UL-SCH. The transmitting processor 455 performs signal transmitting processing functions of an L1 layer (that is, PHY), including encoding, interleaving, scrambling, modulation, power control/allocation, precoding, generation of physical layer control signaling (including PBCH, PDCCH, PHICH, PCFICH, reference signal), etc. The receiving processor 412 performs signal receiving processing functions of the L1 layer (that is, PHY), including decoding, de-interleaving, descrambling, demodulation, decoding, extraction of physical layer control signaling, etc. The transmitter 416 is configured to convert a baseband signal provided by the transmitting processor 415 into a radio-frequency signal and transmit the radio-frequency signal via the antenna 420. The receiver 416 is configured to convert a radio-frequency signal received via the antenna 420 into a baseband signal and provide the baseband signal to the receiving processor 412.

The UE 450 includes a controller/processor 490, a memory 480, a receiving processor 452, a transmitter/receiver 456, a transmitting processor 455, and a data source 467. The transmitter/receiver 456 includes an antenna 460. The data source 467 provides a packet from a higher layer packet to the controller/processor 490. The controller/processor 490 provides header compression/decompression, encryption/decryption, packet segmentation and reordering, multiplexing/de-multiplexing between a logical channel and a transport channel, to implement the L2 protocol used for the user plane and the control plane. The packet from a higher layer may include data or control information, for example, DL-SCH or UL-SCH. The transmitting processor 490 performs signal transmitting processing functions of an L1 layer (that is, PHY), including encoding, interleaving, scrambling, modulation, power control/allocation, precoding, generation of physical layer control signaling, etc. The receiving processor 452 performs signal receiving processing functions of the L1 layer (that is, PHY), including decoding, de-interleaving, descrambling, demodulation, decoding, extraction of physical layer control signaling, etc. The transmitter 456 is configured to convert a baseband signal provided by the transmitting processor 455 into a radio-frequency signal and transmit the radio-frequency signal via the antenna 460. The receiver 456 is configured to convert a radio-frequency signal received via the antenna 460 into a baseband signal and provide the baseband signal to the receiving processor 452.

In Downlink (DL) transmission, a packet DL-SCH from a higher layer, which includes the first radio signal, the second radio signal and the second signaling in the present disclosure, is provided to the controller/processor 440. The controller/processor 440 performs functions of a layer 2. In downlink transmission, the controller/processor 440 provides header compression, encryption, packet segmentation and reordering, multiplexing between a logical channel and a transport channel, and radio resource allocation for the UE 450 based on various priorities. The controller/processor 440 is also in charge of HARQ operation, retransmission of a lost packet, and a signaling to the UE 450. The transmitting processor 415 performs signal processing functions of the layer 1, including the generation of the first signaling in the present disclosure. The generation of the second signaling and the generation of the physical layer signals of the first radio signal and second radio signal are accomplished at the transmitting processor 415. The signal processing function includes decoding and interleaving, so as to ensure an FEC (Forward Error Correction) and a demodulation corresponding to a modulation scheme (i.e., BPSK, QPSK, etc.) at the UE 450 side. The modulated signals are divided into parallel streams. Each of the parallel streams is mapped into a corresponding subcarrier of multi-carriers and/or multi-carrier symbol. Then the transmitting processor 415 maps the parallel stream into the antenna 420 via the transmitter 416 to as to transmit the parallel stream in the form of Radio Frequency (RF) signals. At the receiving side, every receiver 456 receives a radio frequency signal via the corresponding antenna 460. Every receiver 456 recovers the baseband information modulated to the RF carrier and provides the baseband information to the receiving processor 452. The receiving processor 452 performs signal receiving processing functions of the layer 1, including the detection of the first signaling in the present disclosure, the receiving of the first radio signal and the second radio signal, the receiving of the physical layer signal of the second signaling, etc. Demodulation is conducted corresponding to a modulation scheme (i.e., BPSK, QPSK, etc.) through the multi-carrier symbol in the multi-carrier symbol stream, then decoding and de-interleaving are conducted to recover the data or control signal transmitted by the gNB 410 on the physical channel, and then the data and control signal are provided to the controller/processor 490. The controller/processor 490 performs functions of the layer 2. The controller/processor can be connected to a memory 480 that stores program code and data. The memory 480 is a computer readable media.

In one embodiment, the UE 450 corresponds to the UE in the present disclosure.

In one embodiment, the gNB 410 corresponds to the base station device in the present disclosure.

In one embodiment, the UE 450 device includes at least one processor and at least one memory. The at least one memory includes computer program codes. The at least one memory and the computer program codes are configured to be used in collaboration with the at least one processor. The UE 450 device at least monitors a first signaling in X time intervals and receives a first radio signal, wherein X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

In one embodiment, the UE 450 includes a memory that stores a computer readable instruction program. The computer readable instruction program generates an action when executed by at least one processor. The action includes monitoring a first signaling in X time intervals and receiving a first radio signal, wherein X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

In one embodiment, the gNB 410 device includes at least one processor and at least one memory. The at least one memory includes computer program codes. The at least one memory and the computer program codes are configured to be used in collaboration with the at least one processor. The gNB 410 at least transmits a first signaling in a positive integer number of time intervals of X time intervals and transmits a first radio signal, wherein X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

In one embodiment, the gNB 410 device includes a memory that stores a computer readable instruction program. The computer readable instruction program generates an action when executed by at least one processor. The action includes transmitting a first signaling in a positive integer number of time intervals of X time intervals and transmitting a first radio signal, wherein X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain. At least one of {location of the first subband in frequency domain, subcarrier spacing of subcarriers included in the first subband} is used for determining the X time intervals.

In one embodiment, the receiver 456 (including the antenna 460) and the receiving processor 452 are configured to monitor the first signaling in the present disclosure.

In one embodiment, the receiver 456 (including the antenna 460), the receiving processor 452 and the controller/processor 490 are configured to receive the first radio signal in the present disclosure.

In one embodiment, the receiver 456 (including the antenna 460), the receiving processor 452 and the controller/processor 490 are configured to receive the second radio signal in the present disclosure.

In one embodiment, the receiver 456 (including the antenna 460), the receiving processor 452 and the controller/processor 490 are configured to monitor the second signaling in the present disclosure.

In one embodiment, the transmitter 416 (including the antenna 420) and the transmitting processor 415 are configured to transmit the first signaling in the present disclosure.

In one embodiment, the transmitter 416 (including the antenna 420), the transmitting processor 415 and the controller/processor 440 are configured to transit the first radio signal in the present disclosure.

In one embodiment, the transmitter 416 (including the antenna 420), the transmitting processor 415 and the controller/processor 440 are configured to transit the second radio signal in the present disclosure.

In one embodiment, the transmitter 416 (including the antenna 420), the transmitting processor 415 and the controller/processor 440 are configured to transit the second signaling in the present disclosure.

Embodiment 5

Figure 5:
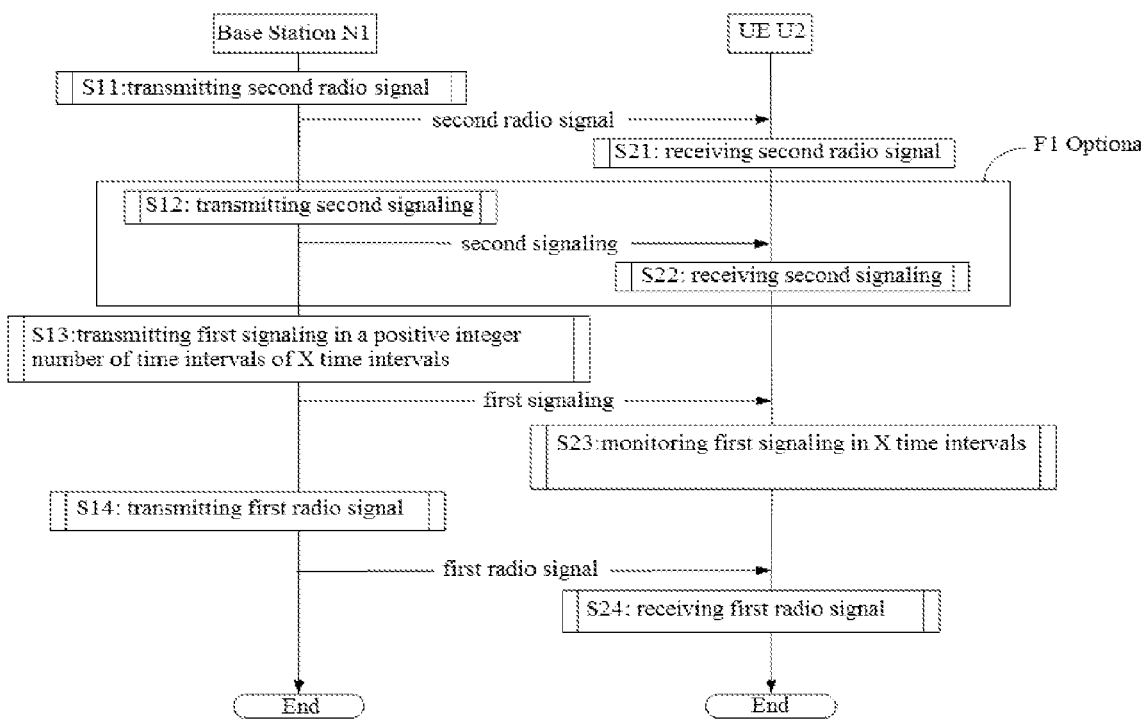
FIG. 5 is a flowchart illustrating the transmission of a radio signal according to one embodiment of the present disclosure.

Embodiment 5 illustrates an example of a flowchart for the transmission of a radio signal according to an embodiment of the present disclosure, as shown in FIG. 5. In FIG. 5, the base station N1 is a maintenance base station for a serving cell of the UE U2. Steps marked in a dotted box are optional.

The base station N1 transmits a second radio signal in S11, transmits a second signaling in S12, transmits a first signaling in a positive integer number of time intervals of X time intervals in S13, and transmits a first radio signal in S14.

The UE U2 receives the second radio signal in S21, receives the second signaling in S22, monitors the first signaling in X time intervals in S23, and receives the first radio signal in S24.

In Embodiment 5, X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals; The second radio signal is used for determining at least one of {location of the first subband in frequency domain, subcarrier spacing of subcarriers included in the first subband}; The second signaling is used for determining Q subbands, Q being a positive integer; The first subband belongs to one of the Q subbands; Any one of the Q subbands includes a positive integer number of consecutive subcarriers; A feature ID of a monitor of the first signaling is used for determining the first subband in the Q subbands.

In one embodiment, any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; The feature ID of the monitor of the first signaling is used for determining the X time intervals in the Y time intervals.

In one embodiment, the first time window belongs to one of Z time windows, Z being an integer greater than 1; Z is predefined, or Z is configurable; Any two of the Z time windows have an equal time length; The feature ID of the monitor of the first signaling is used for determining the first time window in the Z time windows.

In one embodiment, the paging message includes a feature ID of a paged UE.

In one embodiment, the MCS includes one of {QPSK, 16QAM, 64QAM, 256QAM, 1024QAM}.

In one embodiment, the subcarrier spacing is equal to 15 kHz multiplied by 2 to the Kth power. K is an integer.

In one embodiment, the first subband includes a positive integer multiple of 12 subcarriers.

In one embodiment, all subcarriers included in the first subband have an equal subcarrier spacing.

In one embodiment, the location of the first subband in frequency domain refers to the location of the first subband in a carrier where the first subband is located.

In one embodiment, the location of the first subband in frequency domain refers to the location of a carrier where the first subband is located in frequency domain.

In one embodiment, the location of the first subband in frequency domain refers to a subband index of the first subband in a carrier where the first subband is located.

In one embodiment, the location of the first subband in frequency domain refers to the location of the first subband in a frequency resource corresponding to a band where the first subband is located.

In one embodiment, the second signaling is a high layer signaling.

In one embodiment, the second signaling is a physical layer signaling.

In one embodiment, the second signaling is transmitted through a BCH.

In one embodiment, the second signaling is transmitted through a PBCH.

In one embodiment, the second signaling is transmitted through a PDSCH.

In one embodiment, the second signaling is an RRC signaling.

In one embodiment, the second signaling is an SIB.

In one embodiment, the second signaling is transmitted through a DCI.

Embodiment 6

Figures 6, 7:
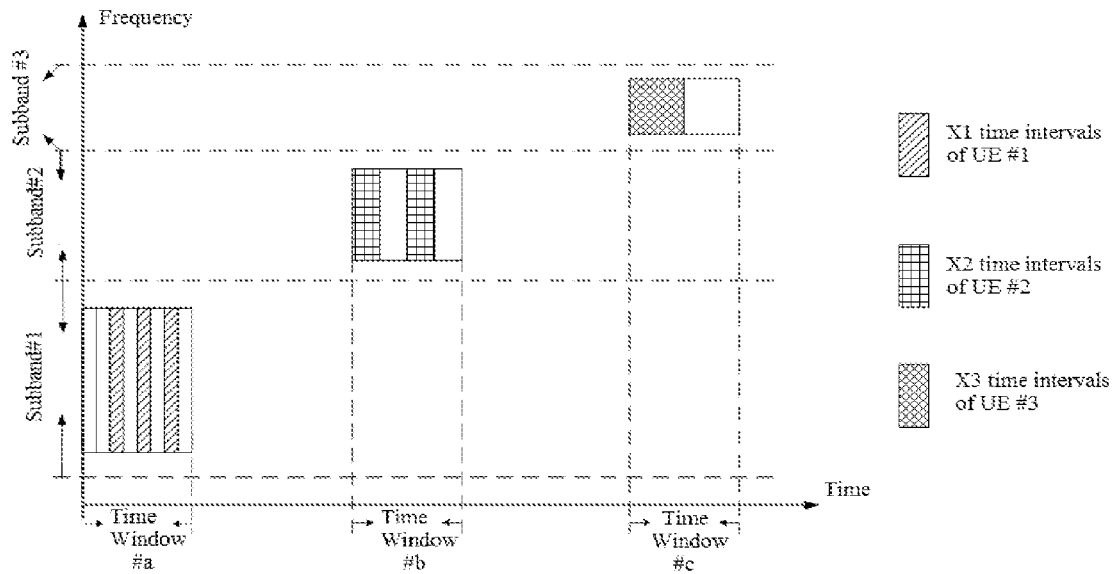
FIG. 6 is a diagram illustrating a relationship between Z time windows and Q subbands according to one embodiment of the present disclosure.
FIG. 7 is a diagram illustrating a relationship between a first time window and X time intervals according to one embodiment of the present disclosure.

Embodiment 6 illustrates an example of a diagram for a relationship between Z time windows and Q subbands according to one embodiment of the present disclosure, as shown in FIG. 6. In FIG. 6, the horizontal axis represents time, the vertical axis represents frequency, each rectangle represents a time interval, the rectangles filled by oblique lines represent X1 time intervals monitored by a UE #1 in a time window #a, the rectangles filled by cross lines represent X2 time intervals monitored by a UE #2 in a time window #b, the rectangles filled by crossed oblique lines represent X3 time intervals monitored by a UE #3 in a time window #c.

In embodiment 6, the UE #1 monitors a first signaling in X1 time intervals respectively. The frequency domain resource used for transmitting the first signaling belongs to the subband #1. The subband #1 includes a positive integer number of consecutive subcarriers in frequency domain. At least one of {location of the subband #1 in frequency domain, subcarrier spacing of subcarriers included in the subband #1} is used for determining the X1 time intervals. Any one of the X1 time intervals belongs to the time window #a in time domain. The time length of the time window #a is predefined. The time window #a is divided into Y1 time intervals. The X1 time intervals are X1 time intervals of the Y1 time intervals, Y1 being a positive integer not smaller than X1. The subcarrier spacing of subcarriers included in the subband #1 is used for determining Y1. A feature ID of the UE #1 is used for determining the X1 time intervals in the Y1 time intervals. The time window #a belongs to one of Z time windows, Z being an integer greater than 1. Z is predefined, or Z is configurable. Any two of the Z time windows have an equal time length. The feature ID of the UE #1 is used for determining the time window #a in the Z time windows. The subband #1 belongs to one of the Q subbands, Q being a positive integer. Any one of the Q subbands includes a positive integer number of consecutive subcarriers. The feature ID of the UE #1 is used for determining the subband #1 in the Q subbands.

In one embodiment, Z is equal to 10.

In one embodiment, any two of the Z time windows are orthogonal in time domain.

In one embodiment, any one of the Z time windows is a subframe. Z is equal to 10, In one embodiment, any one of the Z time windows is a radio frame. Z is equal to the number of radio frames included in a DRX cycle.

In one embodiment, any one of the Z time windows is a radio frame. The time window #a is obtained by the following formula.

$$\text{SFN mod } Z = (Z \text{ div } N)*(\text{UE\_ID mod } N)$$

Herein, SFN is a frame number of a radio frame corresponding to the time window #a, N=min(Z,nB), nB is equal to one of {4Z, 2Z, Z, Z/2, Z/4, Z/8, Z/16, Z/32, Z/64, Z/128, Z/256, Z/512, Z/1024}.

In one embodiment, in any one of the Q subbands, all the included subcarriers have an equal subcarrier spacing.

In one embodiment, in any two of the Q subbands, the subcarriers have different subcarrier spacings.

In one embodiment, in two of the Q subbands, the subcarriers have an equal subcarrier spacing.

In one embodiment, any two of the Q subbands have an equal frequency domain width.

In one embodiment, two of the Q subbands have different frequency domain widths.

In one embodiment, the Q subbands all belong to one same carrier.

In one embodiment, two of the Q subbands belong to different carriers.

Embodiment 7

Embodiment 7 illustrates an example of a diagram for a relationship between a first time window and X time intervals according to one embodiment of the present disclosure, as shown in FIG. 7. FIG. 7 lists the index of X=1 time interval in the first time window according to different Y values and different UE feature IDs.

In embodiment 7, the UE monitors a first signaling in X time intervals respectively. Any one of the X time intervals belongs to a first time window in time domain. The time length of the first time window is predefined. The first time window is divided into Y time intervals. The X time intervals are X time intervals of the Y time intervals, Y being a positive integer not smaller than X. The subcarrier spacing of subcarriers included in the first subband is used for determining Y. The feature ID of the UE is used for determining the X time intervals in the Y time intervals.

In one embodiment, the first signaling is detected P times at most in each one of the X time intervals. P is a positive integer.

In one embodiment, any two of the X time intervals have an equal time length.

In one embodiment, two of the X time times have different time lengths.

In one embodiment, any one of the X time intervals is a slot.

In one embodiment, any two of the X time intervals have an equal time length, and the time length of each one of the X time intervals is correlated to the subcarrier spacing of subcarriers included in the first subband.

In one embodiment, any one of the X time intervals is M OFDM symbols. M is a positive integer smaller than 14.

In one embodiment, any one of the X time intervals is M OFDM symbols. M is a positive integer smaller than 7.

In one embodiment, any two of the X time intervals are orthogonal in time domain. The orthogonality refers that there is no time unit that belongs to any two of the X time intervals simultaneously.

In one embodiment, two of the X time intervals are discrete in time domain.

In one embodiment, the time length of the first time window is fixed.

In one embodiment, the first time window includes a positive integer number of consecutive multi-carrier symbols.

In one embodiment, the multi-carrier symbol includes a data symbol and a CP.

In one embodiment, the first time window has a time length of 1 millisecond.

In one embodiment, the first time window has a time length of 10 milliseconds.

In one embodiment, the first time window is a subframe.

In one embodiment, the first time window is a radio frame.

In one embodiment, any two of the Y time intervals have an equal time length.

In one embodiment, Y is proportional to the subcarrier spacing of subcarriers included in the first subband.

In one embodiment, the feature ID refers to an IMSI.

In one embodiment, the feature ID refers to a remainder when the IMSI is divided by 1024.

In one embodiment, the feature ID refers to a remainder when the IMSI is divided by 4096.

In one embodiment, the feature ID refers to a remainder when the IMSI is divided by 16384.

In one embodiment, the feature ID refers to a C-RNTI.

Embodiment 8

Figure 8:
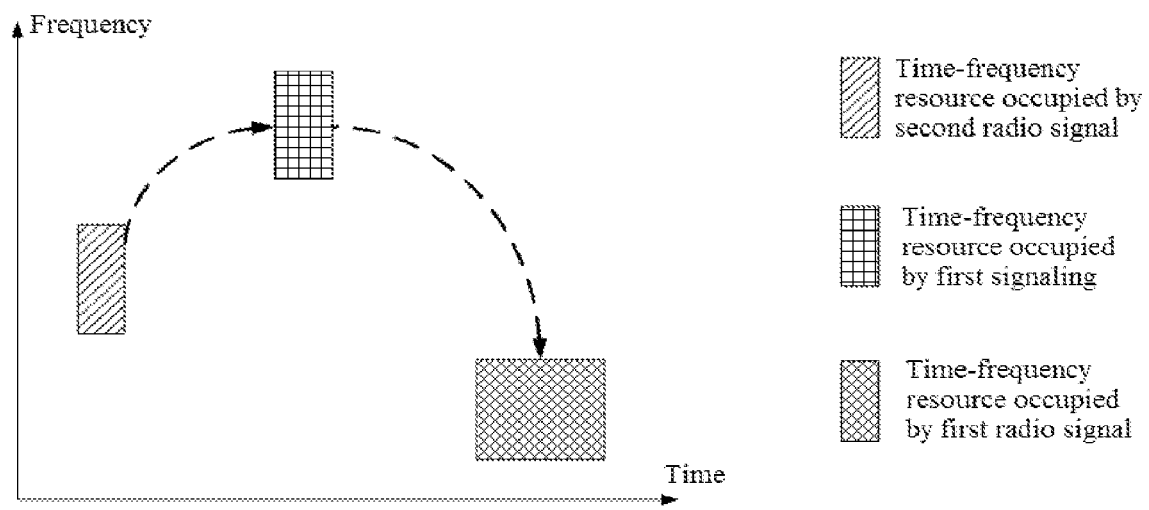
FIG. 8 is a diagram illustrating a relationship among a first signaling, a first radio signal and a second radio signal according to one embodiment of the present disclosure.

Embodiment 8 illustrates an example of a diagram for a relationship among a first signaling, a first radio signal and a second radio signal according to one embodiment of the present disclosure, as shown in FIG. 8. In FIG. 8, the horizontal axis represents time, the vertical axis represents frequency, the rectangle filled by oblique lines represents a time-frequency resource occupied by the second radio signal, the rectangle filled by cross lines represents a time-frequency resource occupied by the first signaling, the rectangle filled by crossed oblique lines represents a time-frequency resource occupied by the first radio signal, and the dotted arrow represents a specific usage relationship.

In embodiment 8, the first signaling is used for determining scheduling information for the first radio signal. The scheduling information includes at least one of {occupied time-frequency resource, adopted MCS, subcarrier spacing of subcarriers in occupied frequency domain resource}. The frequency domain resource used for transmitting the first signaling belongs to a first subband. The first subband includes a positive integer number of consecutive subcarriers in frequency domain. The second radio signal is used for determining at least one of {location of the first subband in frequency domain, subcarrier spacing of subcarriers included in the first subband}.

In one embodiment, the first signaling is a physical layer signaling.

In one embodiment, the first signaling is DCI.

In one embodiment, the first signaling is transmitted through an NR-PDCCH.

In one embodiment, the first signaling is transmitted through a PDCCH. The PDCCH has a CRC scrambled by a P-RNTI.

In one embodiment, the first radio signal is transmitted through a DL-SCH.

In one embodiment, the first radio signal is transmitted through a PDSCH.

In one embodiment, a first bit block is subjected to a modulation mapper, a layer mapper, precoding, a resource element mapper and OFDM single generation in sequence to obtain the first radio signal. The first bit block includes the output obtained after a code block is subjected to channel coding. In one subembodiment, the code block is a TB. In one subembodiment, the code block is one part of a TB.

In one embodiment, the second radio signal includes a PSS.

In one embodiment, the second radio signal includes an SSS.

In one embodiment, the second radio signal is transmitted through a BCH.

In one embodiment, the second radio signal is transmitted through a PBCH.

In one embodiment, the second radio signal carries MIB information.

In one embodiment, the second radio signal carries SIB information.

In one embodiment, the information carried by the second radio signal is transmitted cyclically.

In one embodiment, the information carried by the second radio signal is transmitted on-demand.

In one embodiment, the second radio signal carries first information. The first information is used for determining at least one of {location of the first subband in frequency domain, subcarrier spacing of subcarriers included in the first subband}.

In one embodiment, the second radio signal carries first information. The first information indicates at least one of {location of the first subband in frequency domain, subcarrier spacing of subcarriers included in the first subband}.

Embodiment 9

Embodiment 9 illustrates an example of a structure block diagram for a processing device in a UE, as shown in FIG.

Figure 9:
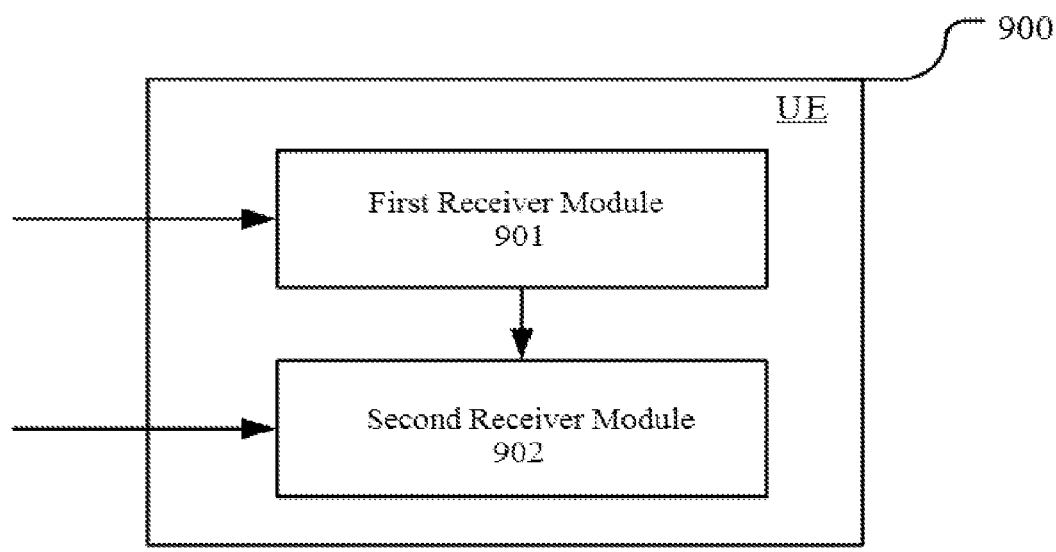
FIG. 9 is a structure block diagram illustrating a processing device in a UE according to one embodiment of the present disclosure.

9. In FIG. 9, the processing device 900 for the UE is mainly composed of a first receiver module 901 and a second receiver module 902. The first receiver module 901 includes the transmitter/receiver 456 (including the antenna 460), the receiving processor 452 and the controller/processor 490 shown in FIG. 4. The second receiver module 902 includes the transmitter/receiver 456 (including the antenna 460), the receiving processor 452 and the controller/processor 490 shown in FIG. 4.

In embodiment 9, the first receiver module 901 monitors a first signaling in X time intervals, and the second receiver module 902 receives a first radio signal, wherein X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

In one embodiment, any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; A feature ID of a monitor of the first signaling is used for determining the X time intervals in the Y time intervals.

In one embodiment, the first time window belongs to one of Z time windows, Z being an integer greater than 1; Z is predefined, or Z is configurable; Any two of the Z time windows have an equal time length; The feature ID of the monitor of the first signaling is used for determining the first time window in the Z time windows.

In one embodiment, the first receiver module 901 further receives a second radio signal; The second radio signal is used for determining at least one of {location of the first subband in frequency domain, subcarrier spacing of subcarriers included in the first subband}.

In one embodiment, the first receiver module 901 further receives a second signaling; The second signaling is used for determining Q subbands, Q being a positive integer; The first subband belongs to one of the Q subbands; Any one of the Q subbands includes a positive integer number of consecutive subcarriers; The feature ID of the monitor of the first signaling is used for determining the first subband in the Q subbands.

Embodiment 10

Figure 10:
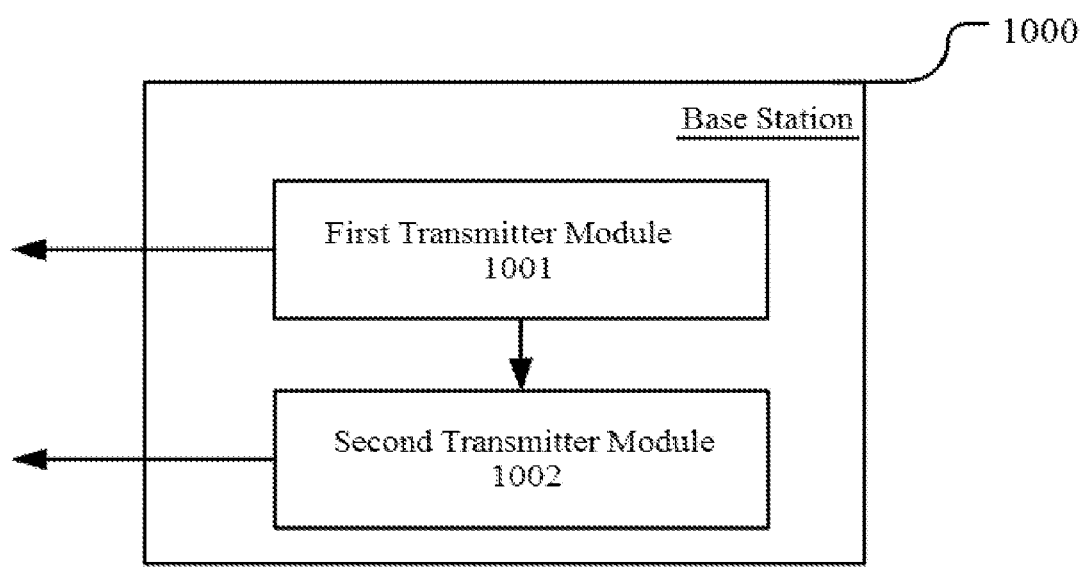
FIG. 10 is a structure block diagram illustrating a processing device in a base station according to one embodiment of the present disclosure.

Embodiment 10 illustrates an example of a structure block diagram for a processing device in a base station, as shown in FIG. 10. The processing device 1000 for the base station is mainly composed of a first transmitter module 1001 and a second transmitter module 1002. The first transmitter module 1001 includes the transmitter/receiver 416 (including the antenna 420), the transmitting processor 415 and the controller/processor 440 shown in FIG. 4. The second transmitter module 1002 is mainly composed of the transmitter/receiver 416 (including the antenna 420), the transmitting processor 415 and the controller/processor 440 shown in FIG. 4.

In embodiment 10, the first transmitter module 1001 transmits a first signaling in a positive integer number of time intervals of X time intervals, and the second transmitter module 1002 transmits a first radio signal, wherein X is a positive integer; The first signaling is used for determining scheduling information for the first radio signal; The scheduling information includes at least one of {occupied time-frequency resource, adopted MCS, subcarrier spacing of subcarriers in occupied frequency domain resource}; The first radio signal carries a paging message; The frequency domain resource used for transmitting the first signaling belongs to a first subband; The first subband includes a positive integer number of consecutive subcarriers in frequency domain; At least one of {location of the first subband in frequency domain, subcarrier spacing of subcarriers included in the first subband} is used for determining the X time intervals.

In one embodiment, any one of the X time intervals belongs to a first time window in time domain; The time length of the first time window is predefined; The first time window is divided into Y time intervals; The X time intervals are X time intervals of the Y time intervals, Y being a positive integer not smaller than X; The subcarrier spacing of subcarriers included in the first subband is used for determining Y; A feature ID of a monitor of the first signaling is used for determining the X time intervals in the Y time intervals.

In one embodiment, the first time window belongs to one of Z time windows, Z being an integer greater than 1; Z is predefined, or Z is configurable; Any two of the Z time windows have an equal time length; The feature ID of the monitor of the first signaling is used for determining the first time window in the Z time windows.

In one embodiment, the first transmitter module 1001 further transmits a second radio signal; The second radio signal is used for determining at least one of {location of the first subband in frequency domain, subcarrier spacing of subcarriers included in the first subband}.

In one embodiment, the first transmitter module 1001 further transmits a second signaling; The second signaling is used for determining Q subbands, Q being a positive integer; The first subband belongs to one of the Q subbands; Any one of the Q subbands includes a positive integer number of consecutive subcarriers; The feature ID of the monitor of the first signaling is used for determining the first subband in the Q subbands.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to mobile phones, tablet computers, notebooks, network cards, low-power equipment, eMTC equipment, NB-IoT equipment, unmanned aerial vehicles, telecontrolled aircrafts, vehicle-mounted communication equipment and other wireless communication equipment. The base station in the present disclosure includes but not limited to macro-cellular base stations, micro-cellular base stations, home base stations, relay base station, eNB, gNB, TRP and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for paging, comprising:
monitoring a first signaling in X time intervals; and
receiving a first radio signal;
wherein X is a positive integer; the first signaling is used for determining scheduling information for the first radio signal; the scheduling information comprises occupied time-frequency resource, adopted Modulation Coding Scheme (MCS), and subcarrier spacing of subcarriers in occupied frequency domain resource; the first radio signal carries a paging message; the frequency domain resource used for transmitting the first signaling belongs to a first subband; the first subband comprises a positive integer number of consecutive subcarriers in frequency domain; and location of the first subband in frequency domain is used for determining the X time intervals.

2. The method according to claim 1, wherein any one of the X time intervals belongs to a first time window in time domain; the time length of the first time window is predefined; the first time window is divided into Y time intervals; the X time intervals are X time intervals of the Y time intervals, Y being a positive integer not smaller than X; the subcarrier spacing of subcarriers included in the first subband is used for determining Y; and a feature ID of a monitor of the first signaling is used for determining the X time intervals in the Y time intervals, the feature ID refers to a remainder when an International Mobile Subscriber Identification Number (IMSI) is divided by 1024.

3. The method according to claim 2, wherein the first time window belongs to one of Z time windows, Z being an integer greater than 1; Z is predefined, or Z is configurable; any two of the Z time windows have an equal time length, any two of the Z time windows are orthogonal in time domain, any one of the Z time windows is a radio frame, Z is equal to the number of radio frames included in a Discontinuous Reception (DRX) cycle; and the feature ID of the monitor of the first signaling is used for determining the first time window in the Z time windows.

4. The method according to claim 3, further comprising:
receiving a third signaling;
wherein, the third signaling is used for configuring Z.

5. The method according to claim 1, further comprising:
receiving a second radio signal;
wherein the second radio signal is used for determining at least one of location of the first subband in frequency domain, or subcarrier spacing of subcarriers included in the first subband; the second radio signal carries Master Information Block (MIB) information, or the second radio signal carries System Information Block (SIB) information.

6. The method according to claim 1, wherein the location of the first subband in frequency domain and the subcarrier spacing of subcarriers included in the first subband are used for determining the X time intervals.

7. A method in a base station for paging, comprising:
transmitting a first signaling in a positive integer number of time intervals of X time intervals; and
transmitting a first radio signal;
wherein X is a positive integer; the first signaling is used for determining scheduling information for the first radio signal; the scheduling information comprises occupied time-frequency resource, adopted MCS, and subcarrier spacing of subcarriers in occupied frequency domain resource; the first radio signal carries a paging message; the frequency domain resource used for transmitting the first signaling belongs to a first subband; the first subband comprises a positive integer number of consecutive subcarriers in frequency domain; and location of the first subband in frequency domain is used for determining the X time intervals.

8. The method according to claim 7, wherein any one of the X time intervals belongs to a first time window in time domain; the time length of the first time window is predefined; the first time window is divided into Y time intervals; the X time intervals are X time intervals of the Y time intervals, Y being a positive integer not smaller than X; the subcarrier spacing of subcarriers included in the first subband is used for determining Y; and a feature ID of a monitor of the first signaling is used for determining the X time intervals in the Y time intervals, the feature ID refers to a remainder when an International Mobile Subscriber Identification Number (IMSI) is divided by 1024.

9. The method according to claim 8, wherein the first time window belongs to one of Z time windows, Z being an integer greater than 1; Z is predefined, or Z is configurable; any two of the Z time windows have an equal time length, any two of the Z time windows are orthogonal in time domain, any one of the Z time windows is a radio frame, Z is equal to the number of radio frames included in a Discontinuous Reception (DRX) cycle; and the feature ID of the monitor of the first signaling is used for determining the first time window in the Z time windows.

10. The method according to claim 9, further comprising:
receiving a third signaling;
wherein, the third signaling is used for configuring Z.

11. The method according to claim 7, further comprising:
transmitting a second radio signal;
wherein the second radio signal is used for determining at least one of location of the first subband in frequency domain, or subcarrier spacing of subcarriers included in the first subband; the second radio signal carries Master Information Block (MIB) information, or the second radio signal carries System Information Block (SIB) information.

12. The method according to claim 7, wherein the location of the first subband in frequency domain and the subcarrier spacing of subcarriers included in the first subband are used for determining the X time intervals.

13. A UE for paging, comprising:
a first receiver, to monitor a first signaling in X time intervals; and
a second receiver, to receive a first radio signal;
wherein X is a positive integer; the first signaling is used for determining scheduling information for the first radio signal; the scheduling information comprises occupied time-frequency resource, adopted MCS, and subcarrier spacing of subcarriers in occupied frequency domain resource; the first radio signal carries a paging message; the frequency domain resource used for transmitting the first signaling belongs to a first subband; the first subband comprises a positive integer number of consecutive subcarriers in frequency domain; and location of the first subband in frequency domain is used for determining the X time intervals.

14. The UE according to claim 13, wherein any one of the X time intervals belongs to a first time window in time domain; the time length of the first time window is predefined; the first time window is divided into Y time intervals; the X time intervals are X time intervals of the Y time intervals, Y being a positive integer not smaller than X; the subcarrier spacing of subcarriers included in the first subband is used for determining Y; and a feature ID of a monitor of the first signaling is used for determining the X time intervals in the Y time intervals, the feature ID refers to a remainder when an International Mobile Subscriber Identification Number (IMSI) is divided by 1024.

15. The UE according to claim 14, wherein the first time window belongs to one of Z time windows, Z being an integer greater than 1; Z is predefined, or Z is configurable; any two of the Z time windows have an equal time length, any two of the Z time windows are orthogonal in time domain, any one of the Z time windows is a radio frame, Z is equal to the number of radio frames included in a Discontinuous Reception (DRX) cycle; and the feature ID of the monitor of the first signaling is used for determining the first time window in the Z time windows.

16. The method according to claim 15, wherein the second receiver further receives a third signaling, the third signaling is used for configuring Z.

17. The UE according to claim 13, wherein the first receiver further receives a second radio signal; the second radio signal is for determining at least one of location of the first subband in frequency domain, or subcarrier spacing of subcarriers included in the first subband; the second radio signal carries Master Information Block (MIB) information, or the second radio signal carries System Information Block (SIB) information.

18. The UE according to claim 13, wherein the location of the first subband in frequency domain and the subcarrier spacing of subcarriers included in the first subband are used for determining the X time intervals.

19. A base station for paging, comprising:
a first transmitter, to transmit a first signaling in a positive integer number of time intervals of X time intervals; and
a second transmitter, to transmit a first radio signal;
wherein X is a positive integer; the first signaling is used for determining scheduling information for the first radio signal; the scheduling information comprises at least one of occupied time-frequency resource, adopted MCS, and subcarrier spacing of subcarriers in occupied frequency domain resource; the first radio signal carries a paging message; the frequency domain resource used for transmitting the first signaling belongs to a first subband; the first subband comprises a positive integer number of consecutive subcarriers in frequency domain; and subcarrier spacing of subcarriers included in the first subband location of the first subband in frequency domain is used for determining the X time intervals.

20. The base station according to claim 19, wherein any one of the X time intervals belongs to a first time window in time domain; the time length of the first time window is predefined; the first time window is divided into Y time intervals; the X time intervals are X time intervals of the Y time intervals, Y being a positive integer not smaller than X; the subcarrier spacing of subcarriers included in the first subband is used for determining Y; and a feature ID of a monitor of the first signaling is used for determining the X time intervals in the Y time intervals, the feature ID refers to a remainder when an International Mobile Subscriber Identification Number (IMSI) is divided by 1024.

21. The base station according to claim 20, wherein the first time window belongs to one of Z time windows, Z being an integer greater than 1; Z is predefined, or Z is configurable; any two of the Z time windows have an equal time length, any two of the Z time windows are orthogonal in time domain, any one of the Z time windows is a radio frame, Z is equal to the number of radio frames included in a Discontinuous Reception (DRX) cycle; and the feature ID of the monitor of the first signaling is used for determining the first time window in the Z time windows.

22. The method according to claim 21, wherein the second transmitter further transmits a third signaling, the third signaling is used for configuring Z.

23. The base station according to claim 19, wherein the first transmitter further transmits a second radio signal; the second radio signal is for determining at least one of location of the first subband in frequency domain, or subcarrier spacing of subcarriers included in the first subband; the second radio signal carries Master Information Block (MIB) information, or the second radio signal carries System Information Block (SIB) information.

24. The base station according to claim 19, wherein the location of the first subband in frequency domain and the subcarrier spacing of subcarriers included in the first subband are used for determining the X time intervals.

* * * * *